United States Patent
Yasuhiko et al.

(10) Patent No.: US 12,504,370 B2
(45) Date of Patent: Dec. 23, 2025

(54) OBSERVATION DEVICE AND OBSERVATION METHOD

(71) Applicant: HAMAMATSU PHOTONICS K.K., Hamamatsu (JP)

(72) Inventors: Osamu Yasuhiko, Hamamatsu (JP); Kozo Takeuchi, Hamamatsu (JP); Hidenao Yamada, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 18/703,751

(22) PCT Filed: Sep. 29, 2022

(86) PCT No.: PCT/JP2022/036580
§ 371 (c)(1),
(2) Date: Apr. 23, 2024

(87) PCT Pub. No.: WO2023/095441
PCT Pub. Date: Jun. 1, 2023

(65) Prior Publication Data
US 2025/0123201 A1   Apr. 17, 2025

(30) Foreign Application Priority Data
Nov. 29, 2021 (JP) ................................. 2021-192918

(51) Int. Cl.
*G01N 21/45* (2006.01)
*G02B 21/36* (2006.01)

(52) U.S. Cl.
CPC ........... *G01N 21/45* (2013.01); *G02B 21/365* (2013.01); *G02B 21/361* (2013.01)

(58) Field of Classification Search
CPC ..... G01N 21/45; G02B 21/365; G02B 21/361
(Continued)

(56) References Cited

U.S. PATENT DOCUMENTS
2015/0177133 A1   6/2015   Choi et al.

FOREIGN PATENT DOCUMENTS
EP          4194923 A1    6/2023
JP    2017-219826 A     12/2017
(Continued)

OTHER PUBLICATIONS

International Preliminary Report on Patentability mailed Jun. 13, 2024 for PCT/JP2022/036580.
(Continued)

*Primary Examiner* — Nguyen T Truong
(74) *Attorney, Agent, or Firm* — Faegre Drinker Biddle & Reath LLP

(57) ABSTRACT

An observation apparatus includes a light source, a mirror, a condenser lens, an objective lens, a beam splitter, an imaging unit, and an analysis unit. The analysis unit includes an interference intensity image acquisition unit, a first complex amplitude image generation unit, a second complex amplitude image generation unit, a phase conjugate operation unit, a two-dimensional phase image generation unit, a three-dimensional phase image generation unit, and a refractive index distribution calculation unit. The analysis unit irradiates an observation object with light along each of a plurality of light irradiation directions by changing an orientation of a reflection surface of the mirror, acquires an interference intensity image at a reference position for each of the plurality of light irradiation directions from the imaging unit, and performs necessary processing based on the interference intensity images to obtain a three-dimensional phase image of the observation object.

17 Claims, 44 Drawing Sheets

(58) Field of Classification Search
USPC .......................................................... 348/79
See application file for complete search history.

(56) References Cited

FOREIGN PATENT DOCUMENTS

| JP | 2019-124679 A | 7/2019 |
| WO | WO-2019/044336 A1 | 3/2019 |
| WO | WO-2020/013325 A1 | 1/2020 |

OTHER PUBLICATIONS

Choi W et al, "Tomographic phase microscopy", Nature Methods, Nature Publishing Group US,New York,vol. 4,No. 9 DOI: 10.1038/NMETH1078, Sep. 1, 2007, p. 717-p. 719, XP003030798.
Kang Sungsam et al, "High-resolution adaptive optical imaging within thick scattering media using closed-loop accumulation of single scattering", Nature Communications,vol. 8,No. 1, DOI: 10.1038/s41467-017-02117-8 URL: https://www.nature.com/articles/s41467-017-02117-8.pdf>, Dec. 1, 2017, p. 1-p. 10, XP055946530.
European Search Report issued on Aug. 12, 2025 in corresponding European patent application 22898226.0.

*Fig.3*
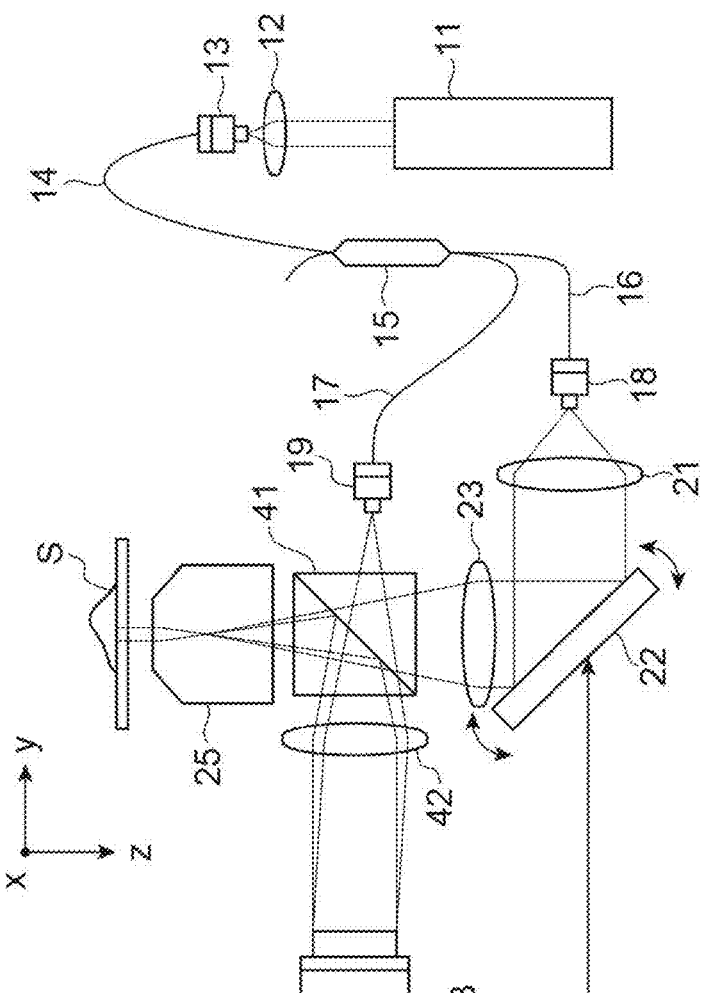
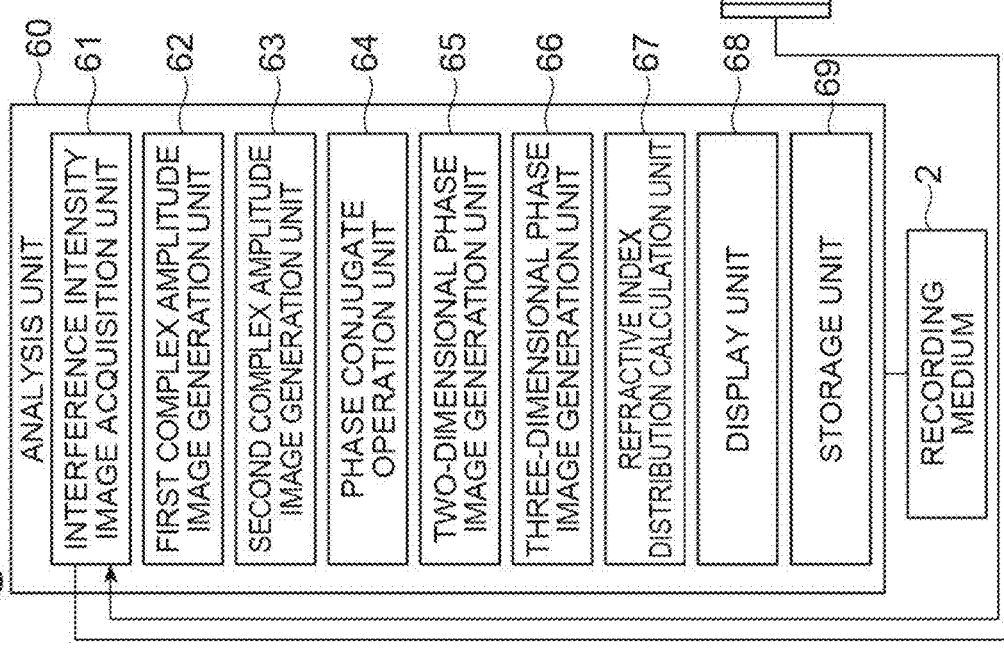

Fig.5
(a)
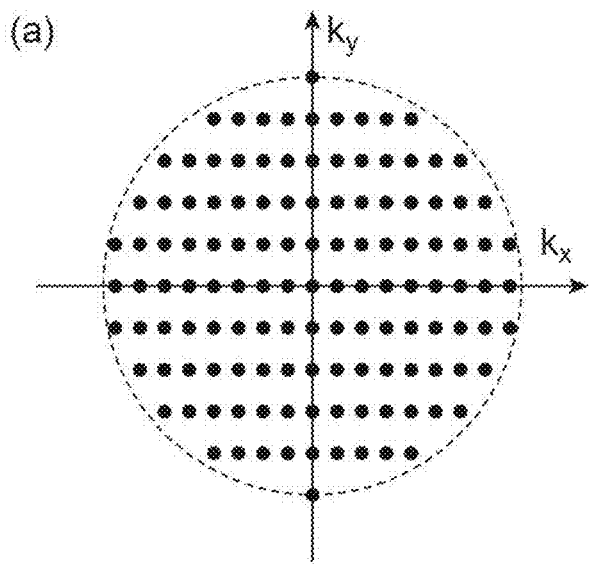
(b)
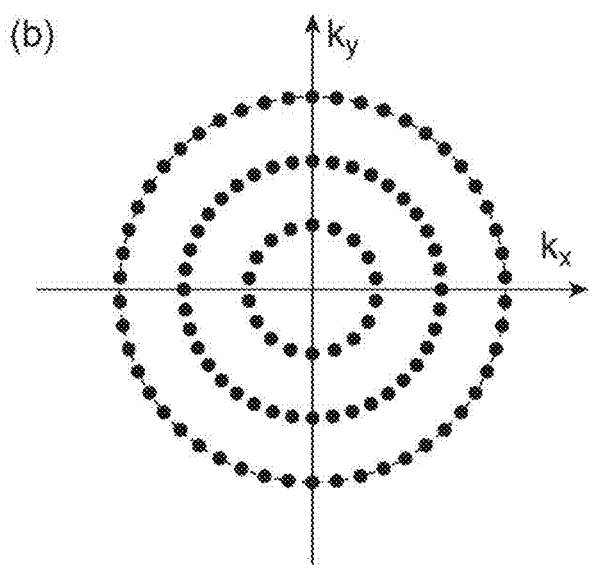
(c)
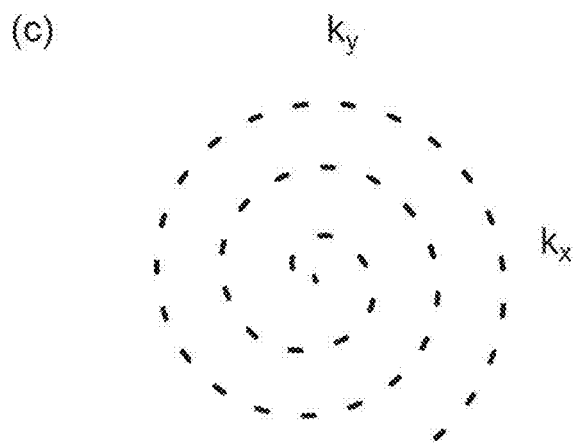

*Fig.7*
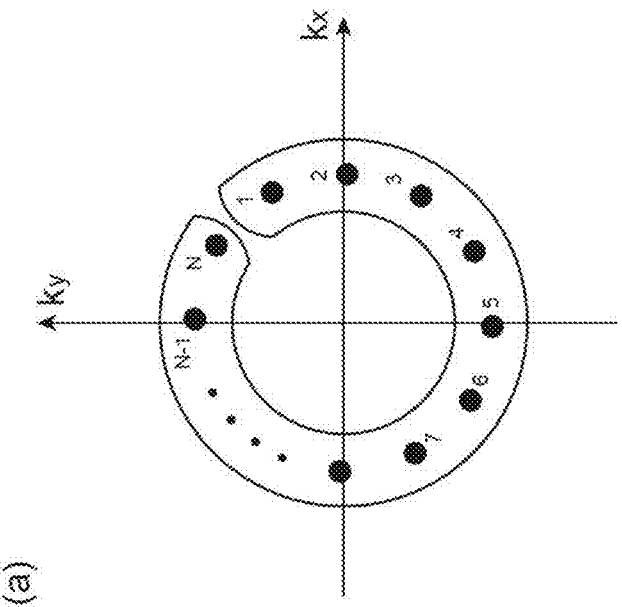
(a)
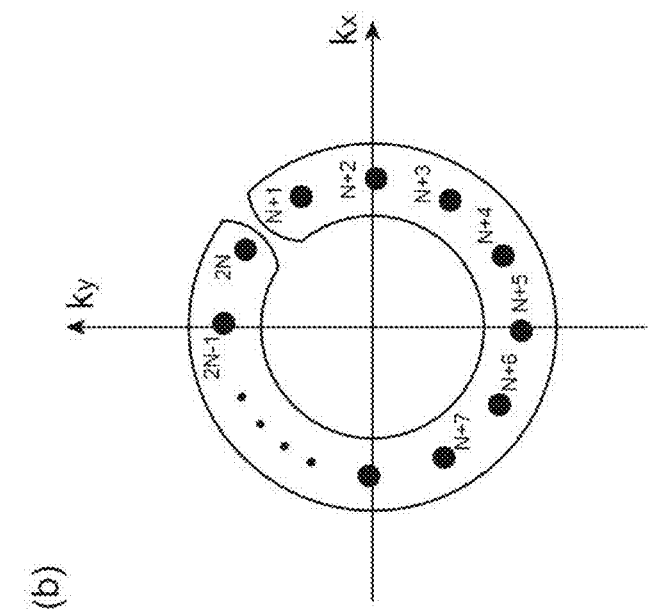
(b)

*Fig.20*
(a) 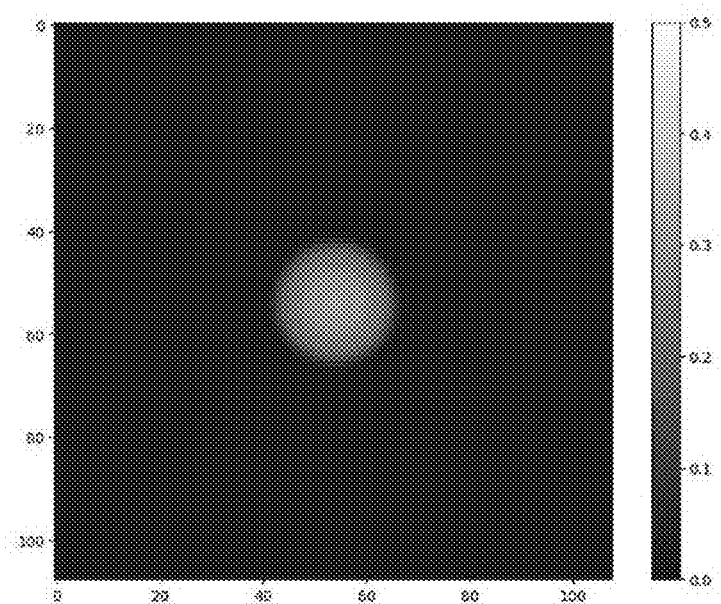
(b) 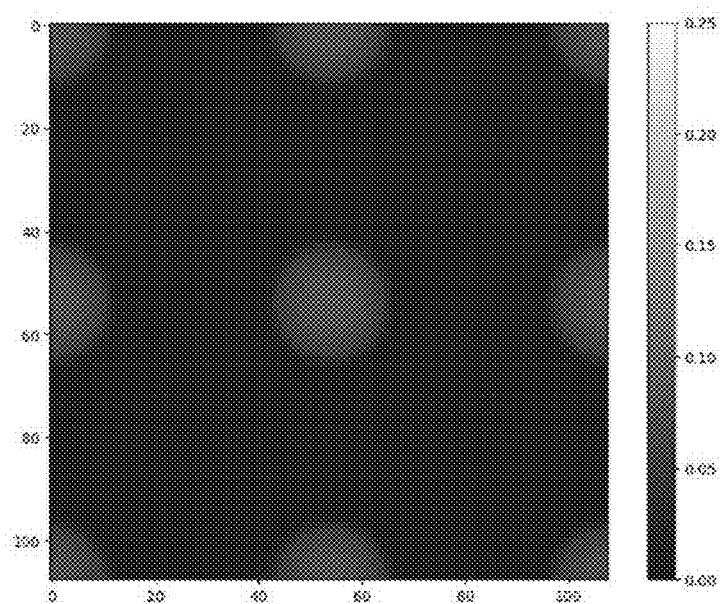

Fig.22
(a) 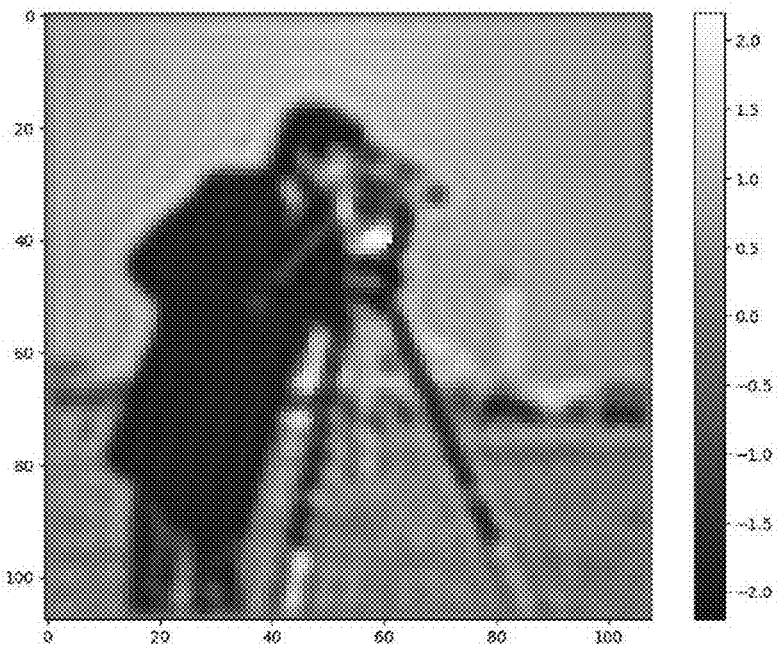
(b) 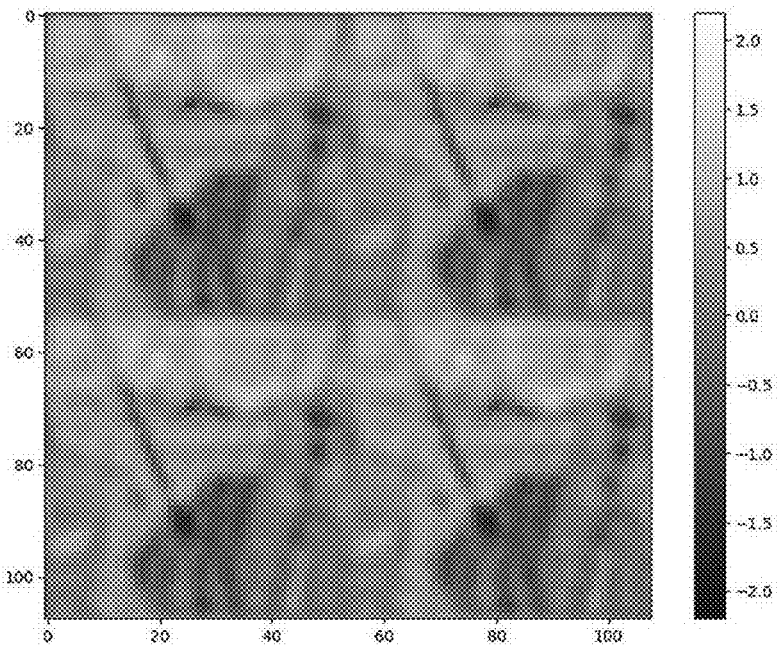

Fig.23
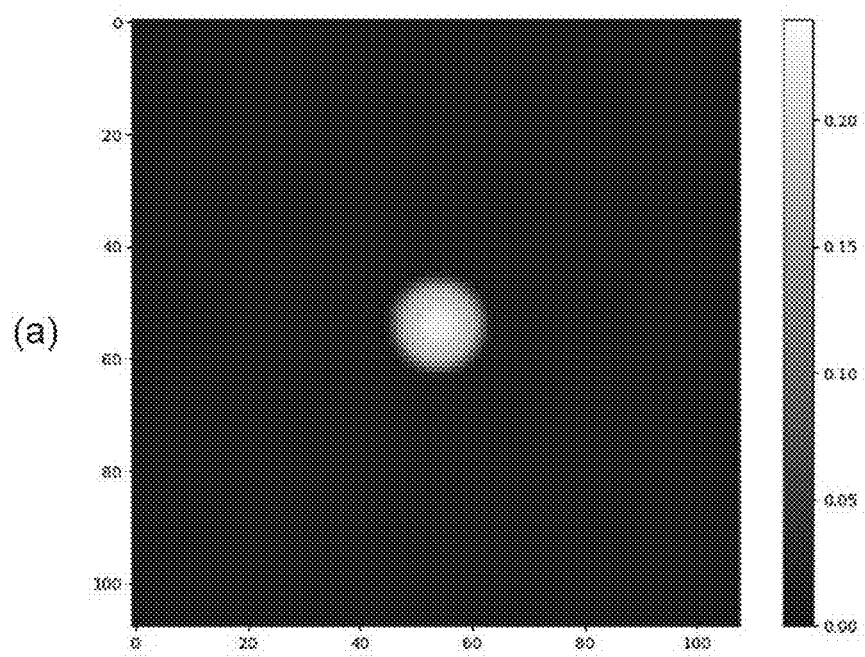
(a)
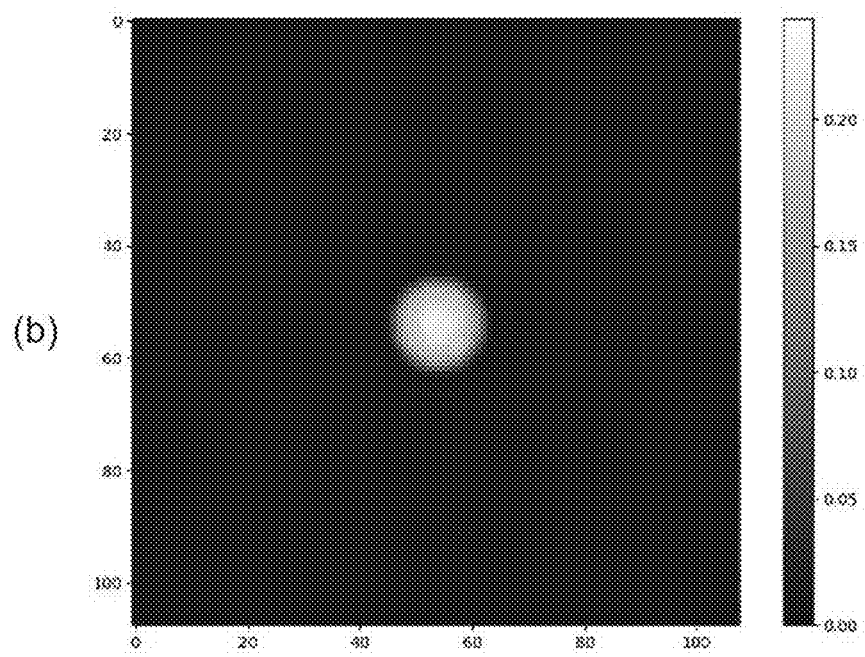
(b)

Fig.24
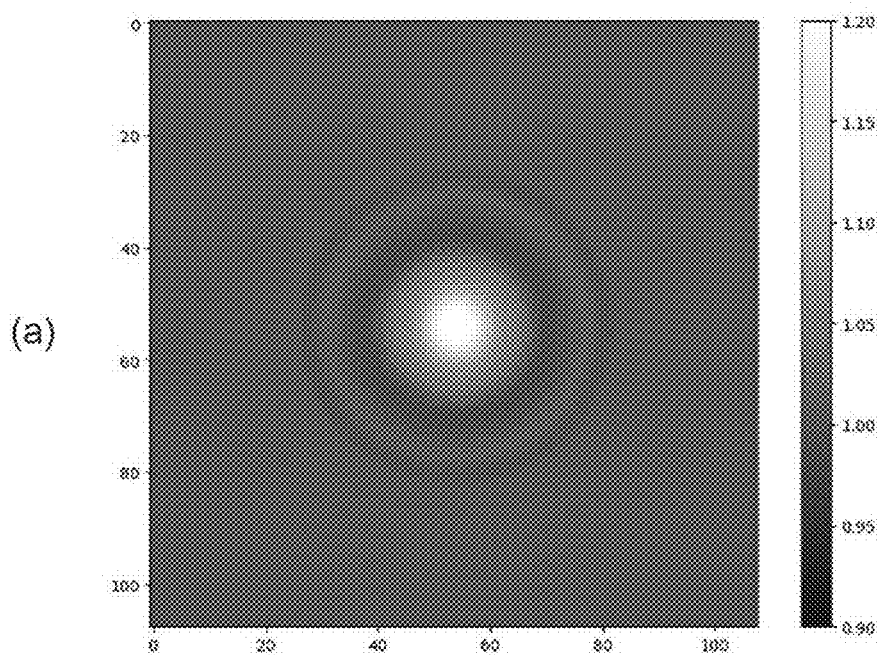
(a)
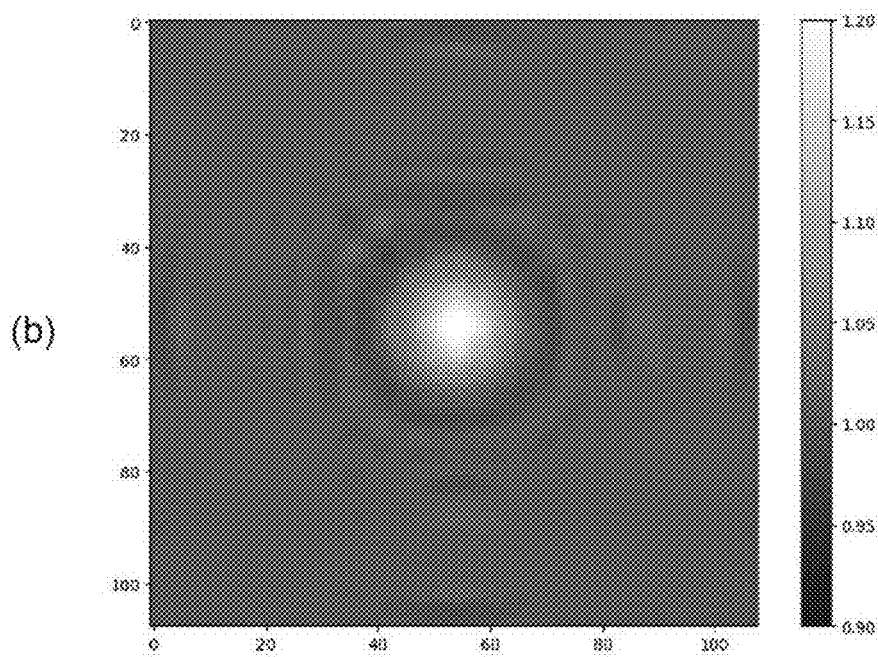
(b)

Fig.34
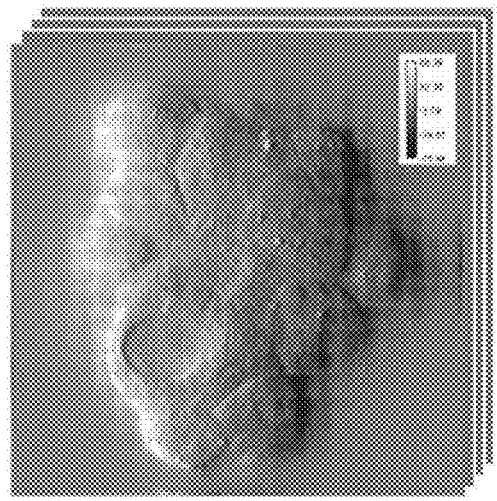
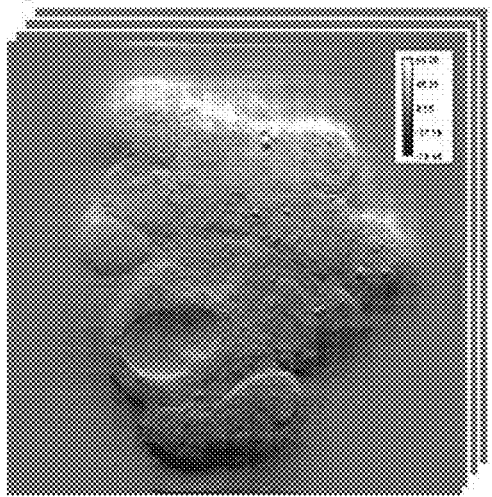
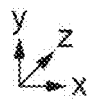

*Fig.35*
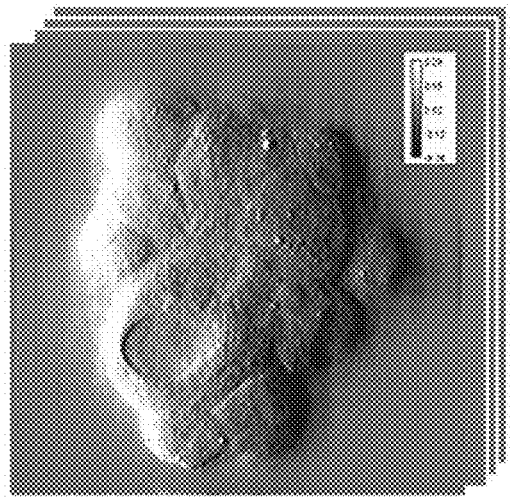
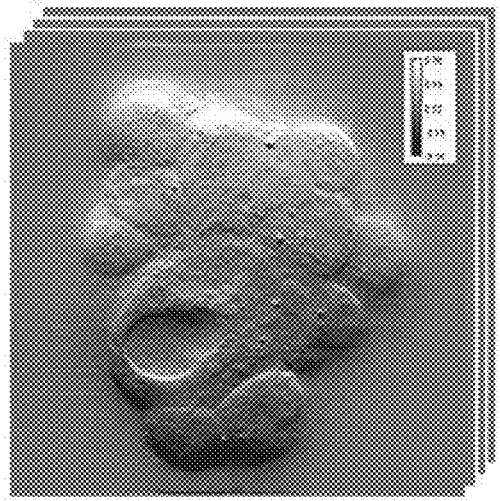
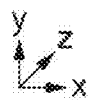

*Fig.36*
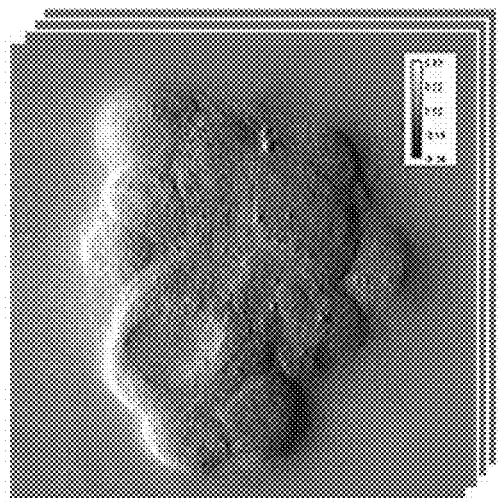
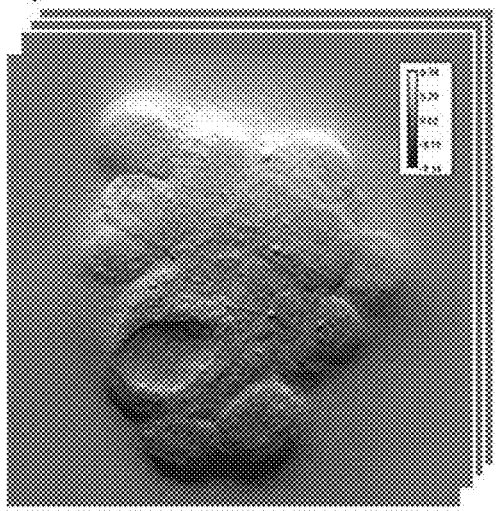
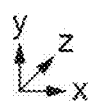

*Fig.37*
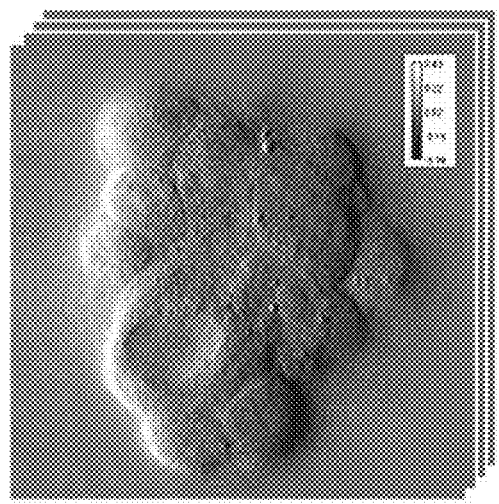
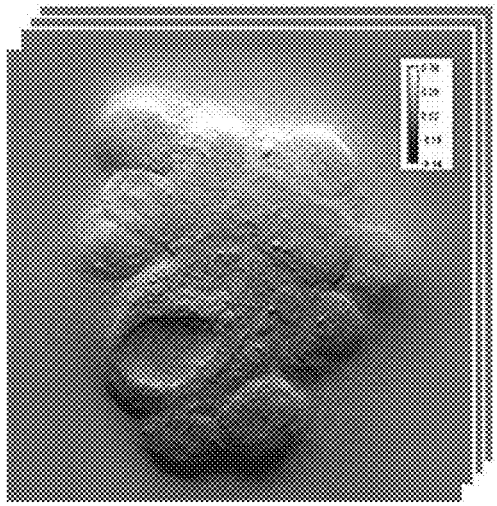

Fig.39
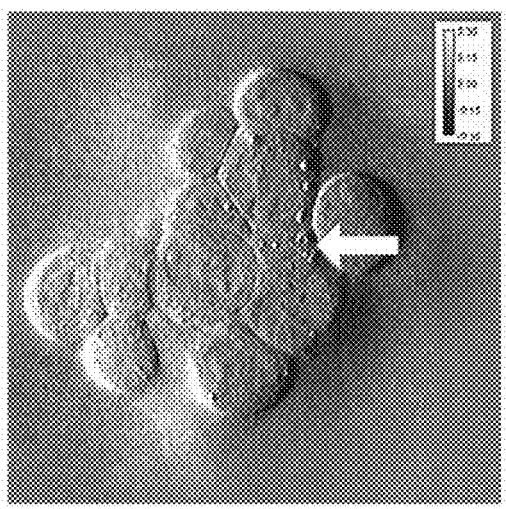
(a)
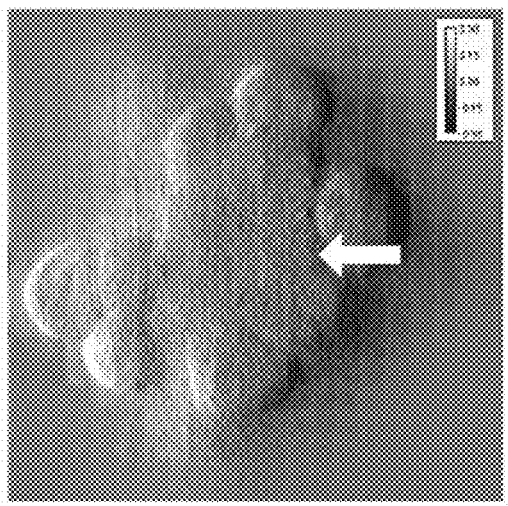
(b)

Fig.40
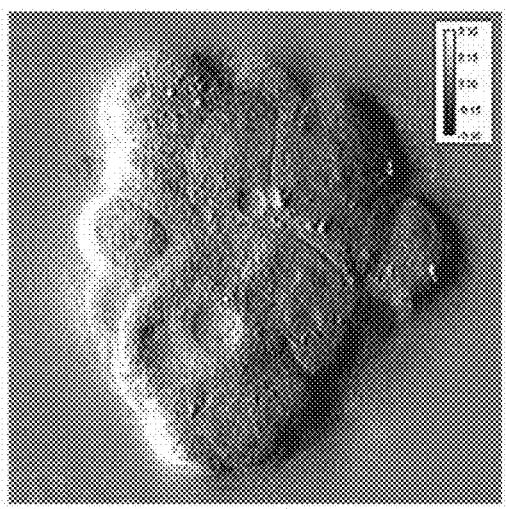
(a)
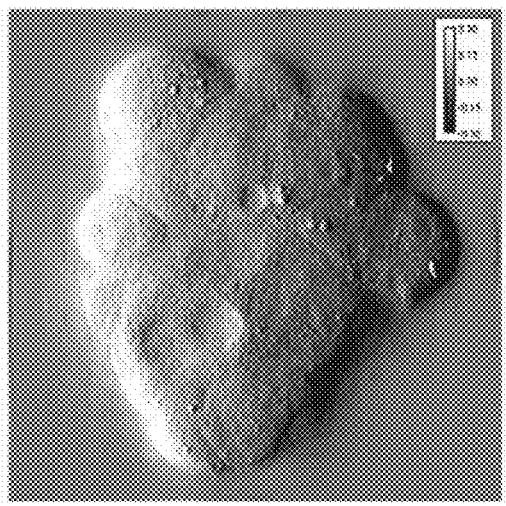
(b)

Fig.41
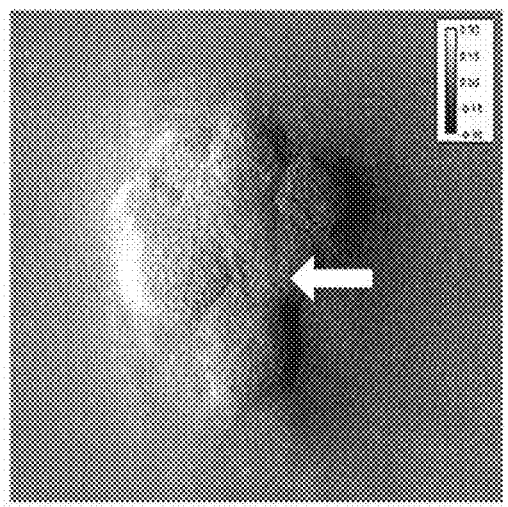
(a)
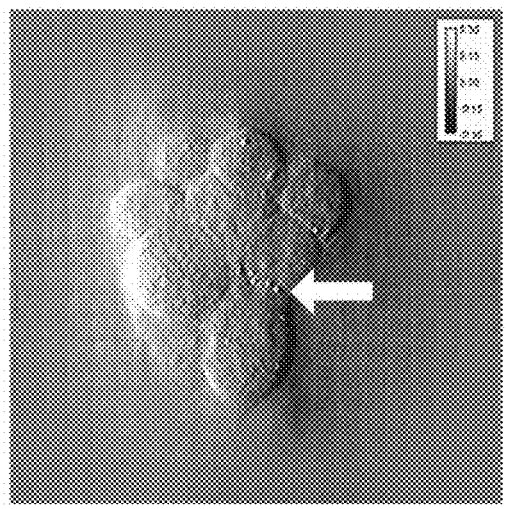
(b)

Fig.42
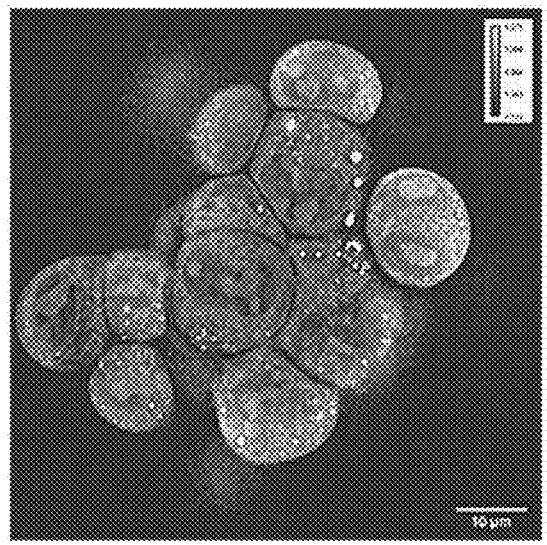
(a)
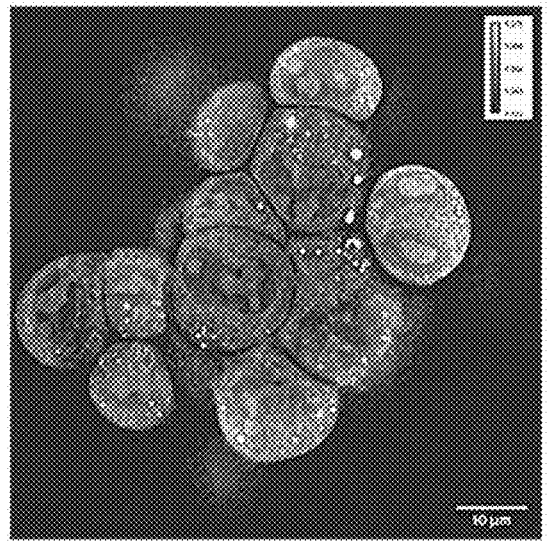
(b)

Fig.43
(a) 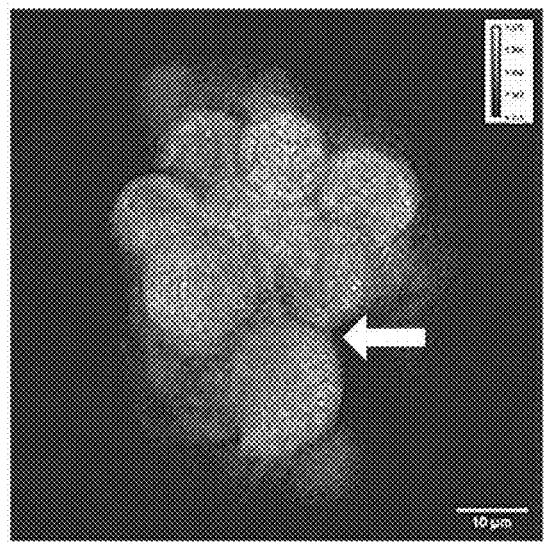
(b) 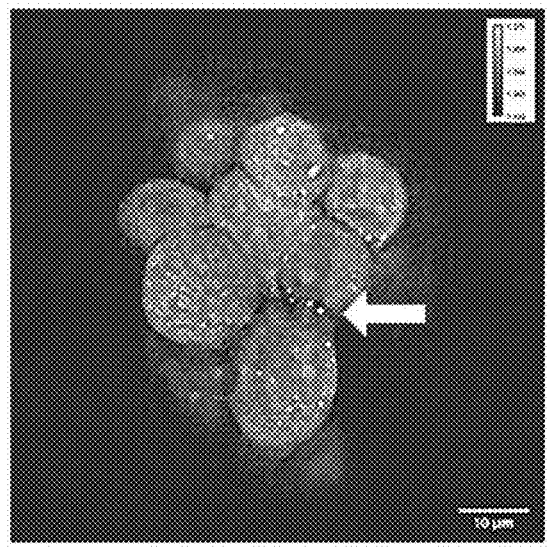

OBSERVATION DEVICE AND OBSERVATION METHOD

TECHNICAL FIELD

The present disclosure relates to an observation apparatus and an observation method.

BACKGROUND ART

In recent years, a technique for producing a three-dimensional cell tissue called a spheroid or an organoid has been developed. Further, a study for applying the above three-dimensional cell tissues to drug development, regenerative medicine, and the like has been developed. The above three-dimensional cell tissue is an optically transparent multiple scattering object. As a technique for imaging the optically transparent scattering object, various methods have been proposed.

In these techniques, examples of an imaging technique using a fluorescent probe include a confocal microscope, a multiphoton microscope, and a light sheet microscope. In addition, as a non-staining and non-invasive imaging technique without using a fluorescent probe, optical coherence tomography (OCT) or the like is known.

The non-staining and non-invasive imaging is often desired for an observation object such as the spheroid or the organoid, however, there are not many reports in which the OCT has been applied to the imaging of the above observation object. The reason may be that a resolution of the imaging by the OCT is low, and it is difficult to interpret a signal obtained by the imaging by the OCT. Therefore, it can be said that the non-staining imaging technique for the three-dimensional cell tissue which can be a gold standard has not been established at the present stage.

A quantitative phase imaging (QPI) is also known as a technique capable of imaging an optical path length of the observation object in a non-staining and non-invasive manner. The QPI can acquire physical information such as the optical path length of the observation object (for example, a cell), and thus, application of the QPI is progressing in a biological field. Images acquired by the QPI can be used to generate other types of images, such as a differential interference image and a phase contrast microscope image.

The QPI is a technique capable of acquiring an image having a relatively large amount of information, and is expected to be applicable to a higher content analysis than a conventional analysis using a bright field image. Further, the high content analysis using the non-staining imaging technique has been actively studied due to improvement in image recognition accuracy by machine learning in recent years, and the non-staining imaging of the multiple scattering object is expected to play an important role in the future. However, the QPI cannot grasp a true three-dimensional structure because the acquired image is merely a two-dimensional projection of the optical path length.

Further, optical diffraction tomography (ODT) described in Patent Document 1 is also known as a technique capable of imaging the optical path length of the observation object in a non-staining and non-invasive manner. The ODT is a development of the QPI into a technique capable of three-dimensional imaging, and can realize three-dimensional refractive index tomography of the observation object. Performing cell observation using the ODT enables identification of organelles such as cell nuclei and mitochondria, and further, enables tracking of three-dimensional structural changes, and is expected to enable higher content analysis than the QPI.

CITATION LIST

Patent Literature

Patent Document 1: Japanese Patent Application Laid-Open Publication No. 2017-219826

SUMMARY OF INVENTION

Technical Problem

However, although the conventional ODT can be applied to the observation of several cells, it is difficult to apply the ODT to the observation of the multiple scattering object such as the three-dimensional cell tissue described above. This is because, in the conventional ODT, when a large amount of multiple scattered light occurs in the observation object, influence of the multiple scattered light significantly appears in the acquired image.

Light scattering refers to a phenomenon in which light interacts with an object to change a traveling direction of the light. In particular, when spatial non-uniformity of a refractive index in the object increases, the light interacts with the object many times in passing through the object. The light which interacts with the object many times as described above is referred to as the multiple scattered light. On the other hand, the light which interacts with the object only once is referred to as single scattered light. It is known that the multiple scattered light causes an increase in speckle and a deterioration in single-scattering to multi-scattering ratio (SMR), and thus, becomes a barrier for performing the measurement.

The speckle is generated by a large change in intensity or phase caused spatially by interference of the multiple scattered light when the light is temporally and spatially coherent. In order to suppress speckle generation, a light source which outputs temporally or spatially incoherent light may be used. For example, a general bright field microscope such as a phase contrast microscope acquires an image without speckles by using a spatially and temporally incoherent light source such as a halogen lamp, a light emitting diode, or the like.

The deterioration of the SMR is caused by that the multiple scattered light becomes dominant over the single scattered light, and the single scattered light is buried in the multiple scattered light. As the observation object becomes larger and an observation depth becomes deeper, a component of the single scattered light exponentially decreases, whereas a component of the multiple scattered light increases.

A scattering direction of the single scattered light has a direct correspondence relationship with a structure of the object, and thus, it is easily used to measure the structure of the object. On the other hand, the relationship between the multiple scattered light and the structure of the object is complex, and it is difficult to extract information on the structure of the object. Therefore, in the imaging technique using the single scattered light, it is known that the measurement fails when the single scattered light is buried in the multiple scattered light (that is, when the SMR deteriorates).

The suppression of the SMR deterioration is possible by a technique called gating for selectively detecting the single scattered light out of the single scattered light and the multiple scattered light. The multiple scattered light is suppressed by the gating, and thus, the speckles can be suppressed at the same time as the SMR deterioration is suppressed. The gating is achieved using degrees of freedom such as space, time, and polarization. The confocal microscope is an example of the spatial gating. The OCT is an example of the temporal and spatial gating.

The conventional ODT does not remove the influence of the multiple scattered light, and thus, the speckle increases in the acquired image and the SMR deteriorates, when the multiple scattered light generated in the observation object is large. Therefore, although the conventional ODT can be applied to the observation of several cells in which the occurrence of the multiple scattered light is small, it is difficult to apply the ODT to the observation of the multiple scattering object such as the three-dimensional cell tissue in which the occurrence of the multiple scattered light is large.

An object of an embodiment is to provide an observation apparatus and an observation method capable of observing an observation object while reducing influence of multiple scattered light even when the observation object is a multiple scattering object.

Solution to Problem

An embodiment is an observation apparatus. The observation apparatus includes (1) an interference intensity image acquisition unit for acquiring, for each of a plurality of light irradiation directions, an interference intensity image at a reference position from an imaging unit for imaging the interference intensity image at the reference position generated by interference between light irradiating an observation object along each of the plurality of light irradiation directions and passed through the observation object and reference light; (2) a first complex amplitude image generation unit for generating, for each of the plurality of light irradiation directions, a complex amplitude image at the reference position based on the interference intensity image at the reference position; (3) a second complex amplitude image generation unit for generating, for each of the plurality of light irradiation directions, a complex amplitude image at each of a plurality of positions based on the complex amplitude image at the reference position; (4) a phase conjugate operation unit for performing, before, during, or after a processing step by the second complex amplitude image generation unit, a phase conjugate operation on the complex amplitude image of each of the plurality of light irradiation directions to generate a complex amplitude image of each of the plurality of light irradiation directions when a relationship between light irradiation and imaging for the observation object is reversed; (5) a two-dimensional phase image generation unit for generating, for each of the plurality of positions, a complex differential interference image of each of the plurality of light irradiation directions based on the complex amplitude image of each of the plurality of light irradiation directions generated by the second complex amplitude image generation unit or the phase conjugate operation unit, and generating a two-dimensional phase image based on the complex differential interference image of each of the plurality of light irradiation directions; and (6) a three-dimensional phase image generation unit for generating a three-dimensional phase image based on the two-dimensional phase image at each of the plurality of positions, and when a phase image generated based on the complex amplitude image before performing the operation by the phase conjugate operation unit is set as a first phase image, and a phase image generated based on the complex amplitude image obtained by performing the operation by the phase conjugate operation unit is set as a second phase image, out of the plurality of positions, the two-dimensional phase image generation unit generates the two-dimensional phase image mainly based on the first phase image at a position relatively close to the imaging unit, and generates the two-dimensional phase image mainly based on the second phase image at a position relatively far from the imaging unit.

An embodiment is an observation method. The observation method includes (1) an interference intensity image acquisition step of acquiring, for each of a plurality of light irradiation directions, an interference intensity image at a reference position from an imaging unit for imaging the interference intensity image at the reference position generated by interference between light irradiating an observation object along each of the plurality of light irradiation directions and passed through the observation object and reference light; (2) a first complex amplitude image generation step of generating, for each of the plurality of light irradiation directions, a complex amplitude image at the reference position based on the interference intensity image at the reference position; (3) a second complex amplitude image generation step of generating, for each of the plurality of light irradiation directions, a complex amplitude image at each of a plurality of positions based on the complex amplitude image at the reference position; (4) a phase conjugate operation step of performing, before, during, or after a processing step by the second complex amplitude image generation step, a phase conjugate operation on the complex amplitude image of each of the plurality of light irradiation directions to generate a complex amplitude image of each of the plurality of light irradiation directions when a relationship between light irradiation and imaging for the observation object is reversed; (5) a two-dimensional phase image generation step of generating, for each of the plurality of positions, a complex differential interference image of each of the plurality of light irradiation directions based on the complex amplitude image of each of the plurality of light irradiation directions generated by the second complex amplitude image generation step or the phase conjugate operation step, and generating a two-dimensional phase image based on the complex differential interference image of each of the plurality of light irradiation directions; and (6) a three-dimensional phase image generation step of generating a three-dimensional phase image based on the two-dimensional phase image at each of the plurality of positions, and when a phase image generated based on the complex amplitude image before performing the operation by the phase conjugate operation step is set as a first phase image, and a phase image generated based on the complex amplitude image obtained by performing the operation by the phase conjugate operation step is set as a second phase image, out of the plurality of positions, the two-dimensional phase image generation step includes generating the two-dimensional phase image mainly based on the first phase image at a position relatively close to the imaging unit, and generating the two-dimensional phase image mainly based on the second phase image at a position relatively far from the imaging unit.

An embodiment is a program. The program is a program for causing a computer to execute the steps of the observation method of the above configuration.

An embodiment is a recording medium. The recording medium is a computer readable recording medium recording the program of the above configuration.

Advantageous Effects of Invention

According to the observation apparatus and the observation method of the embodiments, it is possible to observe an observation object while reducing influence of multiple scattered light even when the observation object is a multiple scattering object.

BRIEF DESCRIPTION OF DRAWINGS

FIG. 3 is a diagram illustrating a configuration of an observation apparatus 1C.

FIG. 5 includes (a)-(c) diagrams illustrating examples of scanning of a light irradiation direction on an observation object S in an interference intensity image acquisition step S61.

FIG. 7 includes (a), (b) diagrams illustrating an example of scanning of the light irradiation direction on the observation object S in the interference intensity image acquisition step S61.

FIG. 20 includes (a) a phase image obtained by performing the phase conjugate operation when a matrix dimension in a light irradiation side wavenumber space is set to 108×108, and (b) a phase image obtained by performing the phase conjugate operation when the matrix dimension in the light irradiation side wavenumber space is set to 54×54.

FIG. 22 includes (a) a phase image obtained by performing the phase conjugate operation when the matrix dimension in the light irradiation side wavenumber space is set to 108×108, and (b) a phase image obtained by performing the phase conjugate operation when the matrix dimension in the light irradiation side wavenumber space is set to 54×54.

FIG. 23 includes (a) a phase image obtained by performing the phase conjugate operation when the matrix dimension in the light irradiation side wavenumber space is set to 108×108 in a case in which the imaging unit is focused on the observation object, and (b) a phase image obtained by performing the phase conjugate operation when the matrix dimension in the light irradiation side wavenumber space is set to 36×36 in a case in which the imaging unit is focused on the observation object.

FIG. 24 includes (a) a phase image obtained by performing the phase conjugate operation when the matrix dimension in the light irradiation side wavenumber space is set to 108×108 in a case in which the imaging unit is not focused on the observation object, and (b) a phase image obtained by performing the phase conjugate operation when the matrix dimension in the light irradiation side wavenumber space is set to 36×36 in a case in which the imaging unit is not focused on the observation object.

FIG. 34 includes complex differential interference images (imaginary parts respectively for x direction shear and y direction shear) generated based on the complex amplitude image (FIG. 33) in a step S21 in the two-dimensional phase image generation step S65.

FIG. 35 includes phase differential images (x direction shear and y direction shear) generated based on the complex differential interference images (FIG. 34) in a step S22 in the two-dimensional phase image generation step S65.

FIG. 36 includes phase differential images (x direction shear and y direction shear) generated based on the complex amplitude image (FIG. 30) in which the phase conjugate operation step S64 is not performed in the step S22 in the two-dimensional phase image generation step S65.

FIG. 37 includes phase differential images (x direction shear and y direction shear) obtained by combining the phase differential images (FIG. 35) obtained in a case in which the phase conjugate operation step S64 is performed and the phase differential images (FIG. 36) obtained in a case in which the phase conjugate operation step S64 is not performed.

FIG. 39 includes phase differential images at a position of z=10.4 μm, and shows (a) the phase differential image obtained in a case in which the phase conjugate operation is not performed, and (b) the phase differential image obtained in a case in which the phase conjugate operation is performed.

FIG. 40 includes phase differential images at a position of z=32.4 μm, and shows (a) the phase differential image obtained in a case in which the phase conjugate operation is not performed, and (b) the phase differential image obtained in a case in which the phase conjugate operation is performed.

FIG. 41 includes phase differential images at a position of z=54.0 μm, and shows (a) the phase differential image obtained in a case in which the phase conjugate operation is not performed, and (b) the phase differential image obtained in a case in which the phase conjugate operation is performed.

FIG. 42 includes refractive index distributions at the position of z=10.4 μm, and shows (a) the refractive index distribution obtained in a case in which the phase conjugate operation is not performed, and (b) the refractive index distribution obtained by combining and reconstructing the phase differential images respectively in a case in which the phase conjugate operation is performed and in a case in which the phase conjugate operation is not performed.

FIG. 43 includes refractive index distributions at the position of z=54.0 μm, and shows (a) the refractive index distribution obtained in a case in which the phase conjugate operation is not performed, and (b) the refractive index distribution obtained by combining and reconstructing the phase differential images respectively in a case in which the phase conjugate operation is performed and in a case in which the phase conjugate operation is not performed.

DESCRIPTION OF EMBODIMENTS

Hereinafter, embodiments of an observation apparatus and an observation method will be described in detail with reference to the accompanying drawings. In the description of the drawings, the same elements will be denoted by the same reference signs, and redundant description will be omitted. The present invention is not limited to these examples, and the Claims, their equivalents, and all the changes within the scope are intended as would fall within the scope of the present invention.

Figure 1:
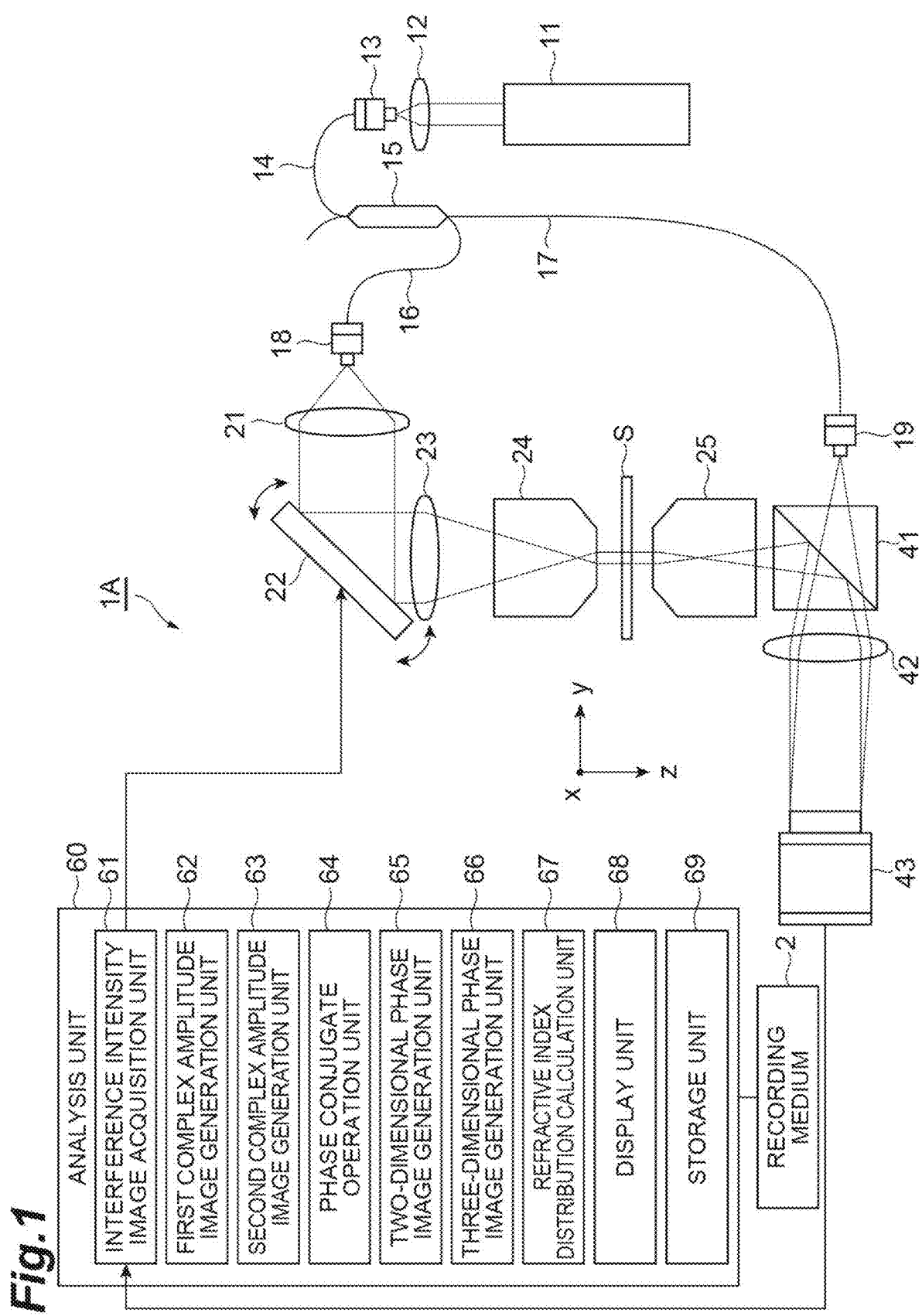
FIG. 1 is a diagram illustrating a configuration of an observation apparatus 1A.

FIG. 1 is a diagram illustrating a configuration of an observation apparatus 1A. The observation apparatus 1A includes a light source 11, a lens 12, a lens 21, a mirror 22, a lens 23, a condenser lens 24, an objective lens 25, a beam splitter 41, a lens 42, an imaging unit 43, and an analysis unit 60.

The light source 11 outputs spatially and temporally coherent light, and is preferably a laser light source. The lens 12 is optically coupled to the light source 11, focuses the light output from the light source 11 on a light input end 13 of an optical fiber 14, and inputs the light to the light input end 13. The optical fiber 14 guides the light input to the light input end 13 by the lens 12 to a fiber coupler 15.

The fiber coupler 15 couples the light between the optical fiber 14 and optical fibers 16 and 17, splits the light guided by and arriving from the optical fiber 14 into two light beams, guides one split light by the optical fiber 16, and guides the other split light by the optical fiber 17. The light guided by the optical fiber 16 is output as diverging light from a light output end 18. The light guided by the optical fiber 17 is output as diverging light from a light output end 19.

The lens 21 is optically coupled to the light output end 18, and collimates the light output as the diverging light from the light output end 18. The mirror 22 is optically coupled to the lens 21, and reflects the light arriving from the lens 21 to the lens 23. An orientation of a reflection surface of the mirror 22 is changeable. The lens 23 is optically coupled to the mirror 22. The condenser lens 24 is optically coupled to the lens 23. The lens 23 and the condenser lens 24 preferably constitute a 4f optical system.

The lens 23 and the condenser lens 24 irradiate an observation object S with the light from a light irradiation direction according to the orientation of the reflection surface of the mirror 22. The objective lens 25 is optically coupled to the condenser lens 24. The observation object S is disposed between the objective lens 25 and the condenser lens 24. The objective lens 25 inputs the light (object light) output from the condenser lens 24 and passed through the observation object S, and outputs the light to the beam splitter 41.

The beam splitter 41 is optically coupled to the objective lens 25, and further, is optically coupled also to the light output end 19. The beam splitter 41 combines the light (object light) output and arriving from the objective lens 25 and the light (reference light) output and arriving from the light output end 19, and outputs the light to the lens 42. The lens 42 is optically coupled to the beam splitter 41, collimates the object light and the reference light arriving from the beam splitter 41, and outputs the light to the imaging unit 43.

The imaging unit 43 is optically coupled to the lens 42, and images an interference fringe image (interference intensity image) generated by interference between the object light and the reference light arriving from the lens 42. An incident direction of the reference light is inclined with respect to an incident direction of the object light on an imaging plane of the imaging unit 43. A position at which the object light and the reference light are combined by the beam splitter 41 may be in the subsequent stage of the imaging lens, and in addition, in consideration of the influence of aberration, it is desirable that the position is set between the objective lens 25 and the lens 42 as illustrated in the diagram.

The analysis unit 60 is electrically connected to the imaging unit 43, and inputs the interference intensity image captured by the imaging unit 43. The analysis unit 60 calculates a three-dimensional refractive index distribution of the observation object S by processing the input interference intensity image. The analysis unit 60 may be a computer. The analysis unit 60 includes an interference intensity image acquisition unit 61, a first complex amplitude image generation unit 62, a second complex amplitude image generation unit 63, a phase conjugate operation unit 64, a two-dimensional phase image generation unit 65, a three-dimensional phase image generation unit 66, a refractive index distribution calculation unit 67, a display unit 68, and a storage unit 69.

The interference intensity image acquisition unit 61 irradiates the observation object S with the light along each of a plurality of light irradiation directions by changing the orientation of the reflection surface of the mirror 22. Further, the interference intensity image acquisition unit 61 acquires the interference intensity image at a reference position for each of the plurality of light irradiation directions from the imaging unit 43.

The interference intensity image acquisition unit 61 includes a CPU, has an output port for outputting a control signal for changing the orientation of the reflection surface of the mirror 22, and has an input port for inputting the interference intensity image from the imaging unit 43. It is not necessary to move the objective lens 25 in an optical axis direction. The reference position is an image plane position having a conjugate relationship with respect to the imaging plane of the imaging unit 43.

The first complex amplitude image generation unit 62, the second complex amplitude image generation unit 63, the phase conjugate operation unit 64, the two-dimensional phase image generation unit 65, the three-dimensional phase image generation unit 66, and the refractive index distribution calculation unit 67 perform processing based on the interference intensity images, and include a processing device such as a CPU, a GPU, a DSP, an FPGA, or the like. The display unit 68 displays an image to be processed, an image in the middle of the processing, an image after the processing, and the like, and includes, for example, a liquid crystal display.

The storage unit 69 stores data of various images, and includes a hard disk drive, a flash memory, a RAM, a ROM, and the like. The first complex amplitude image generation unit 62, the second complex amplitude image generation unit 63, the phase conjugate operation unit 64, the two-dimensional phase image generation unit 65, the three-dimensional phase image generation unit 66, the refractive index distribution calculation unit 67, and the storage unit 69 may be constituted by a cloud computing.

The storage unit 69 also stores a program for causing the interference intensity image acquisition unit 61, the first complex amplitude image generation unit 62, the second complex amplitude image generation unit 63, the phase conjugate operation unit 64, the two-dimensional phase image generation unit 65, the three-dimensional phase image generation unit 66, and the refractive index distribution calculation unit 67 to execute respective steps of the processing. The program may be stored in the storage unit 69 at the time of manufacture or shipment of the observation apparatus 1A, may be acquired via a communication line after shipment and then stored in the storage unit 69, or may be recorded in a computer readable recording medium 2 and then stored in the storage unit 69. The recording medium 2 may be an arbitrary medium such as a flexible disk, a CD-ROM, a DVD-ROM, a BD-ROM, a USB memory, or the like.

The details of the processing step of each of the interference intensity image acquisition unit 61, the first complex amplitude image generation unit 62, the second complex amplitude image generation unit 63, the phase conjugate operation unit 64, the two-dimensional phase image generation unit 65, the three-dimensional phase image generation unit 66, and the refractive index distribution calculation unit 67 will be described later.

Figure 2:
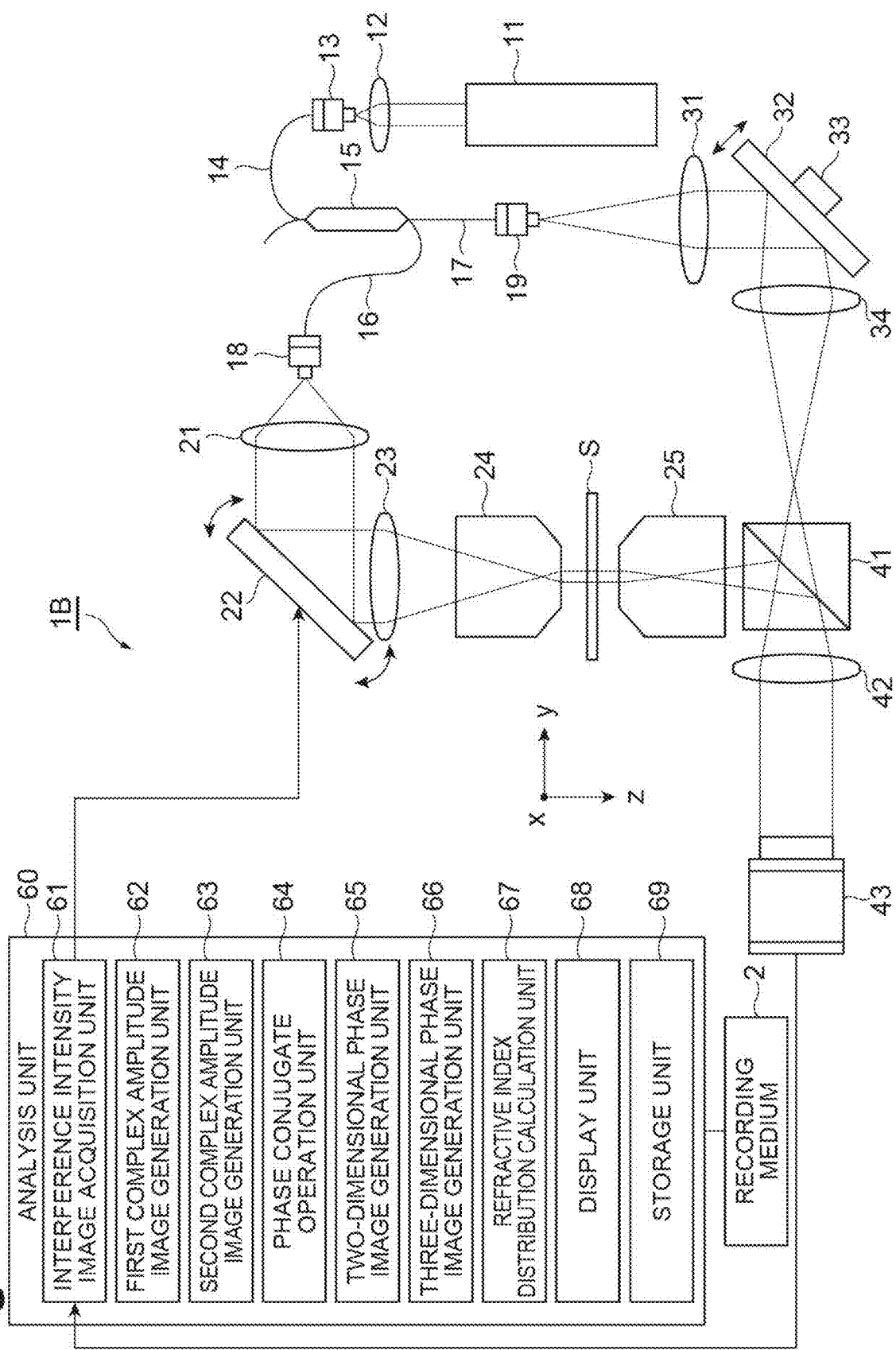
FIG. 2 is a diagram illustrating a configuration of an observation apparatus 1B.

FIG. 2 is a diagram illustrating a configuration of an observation apparatus 1B. The observation apparatus 1B illustrated in FIG. 2 includes a lens 31, a mirror 32, and a lens 34 in addition to the configuration of the observation apparatus 1A illustrated in FIG. 1.

The lens 31 is optically coupled to the light output end 19, and collimates the light (reference light) output as diverging light from the light output end 19. The mirror 32 is optically coupled to the lens 31, and reflects the light arriving from the lens 31 to the lens 34. The lens 34 is optically coupled to the mirror 32, and outputs the light arriving from the mirror 32 to the beam splitter 41.

The light output from the lens 34 is once focused before the beam splitter 41, and then input to the beam splitter 41 as diverging light. The beam splitter 41 combines the light (object light) output and arriving from the objective lens 25 and the light (reference light) output and arriving from the lens 34, and outputs the light to the lens 42 in a coaxial manner. The imaging unit 43 images the interference fringe image (interference intensity image) generated by interference between the object light and the reference light arriving from the lens 42. The incident direction of the reference light is parallel to the incident direction of the object light on the imaging plane of the imaging unit 43.

A drive unit 33 moves the mirror 32 in a direction perpendicular to a reflection surface of the mirror 32. The drive unit 33 is, for example, a piezoelectric actuator. The movement of the mirror 32 changes an optical path difference (phase difference) of the object light and the reference light from light splitting by the fiber coupler 15 to combining by the beam splitter 41. When the optical path difference is different, the interference intensity image captured by the imaging unit 43 is also different.

The observation apparatus is not limited to the configuration examples illustrated in FIG. 1 and FIG. 2, and various modifications are possible. In the configuration of the observation apparatus 1A (FIG. 1) and the observation apparatus 1B (FIG. 2), the light transmitted through the observation object S is the object light, and the light reflected by the observation object S may be the object light as in a configuration of an observation apparatus 1C (FIG. 3) described below.

FIG. 3 is a diagram illustrating a configuration of an observation apparatus 1C. The observation apparatus 1C includes the light source 11, the lens 12, the lens 21, the mirror 22, the lens 23, the objective lens 25, the beam splitter 41, the lens 42, the imaging unit 43, and the analysis unit 60. Hereinafter, differences from the observation apparatus 1A (FIG. 1) will be mainly described.

The lens 21 is optically coupled to the light output end 18 of the optical fiber 16, and collimates the light output as diverging light from the light output end 18. The mirror 22 is optically coupled to the lens 21, and reflects the light arriving from the lens 21 to the lens 23. The orientation of the reflection surface of the mirror 22 is changeable. The lens 23 is optically coupled to the mirror 22. The objective lens 25 is optically coupled to the lens 23.

The beam splitter 41 is disposed between the lens 23 and the objective lens 25. The lens 23 and the objective lens 25 preferably constitute a 4f optical system. The lens 23 and the objective lens 25 irradiate the observation object S with the light from the light irradiation direction according to the orientation of the reflection surface of the mirror 22. The objective lens 25 inputs the light (object light) reflected from the observation object S, and outputs the light to the beam splitter 41.

The beam splitter 41 is optically coupled to the objective lens 25, and further, is optically coupled also to the light output end 19 of the optical fiber 17. The beam splitter 41 combines the light (object light) output and arriving from the objective lens 25 and the light (reference light) output and arriving from the light output end 19, and outputs the light to the lens 42. The lens 42 is optically coupled to the beam splitter 41, collimates the object light and the reference light arriving from the beam splitter 41, and outputs the light to the imaging unit 43.

The imaging unit 43 is optically coupled to the lens 42, and images the interference fringe image (interference intensity image) generated by interference between the object light and the reference light arriving from the lens 42. The incident direction of the reference light is inclined with respect to the incident direction of the object light on the imaging plane of the imaging unit 43. The position at which the object light and the reference light are combined by the beam splitter 41 may be in the subsequent stage of the imaging lens, and in addition, in consideration of the influence of aberration, it is desirable that the position is set between the objective lens 25 and the lens 42 as illustrated in the diagram.

In the configuration of the observation apparatus 1C (FIG. 3), as in the observation apparatus 1B (FIG. 2), the mechanism (the lens 31, the mirror 32, the drive unit 33, and the lens 34 in FIG. 2) for changing the optical path length of the reference light may be provided for changing the optical path difference (phase difference) of the object light and the reference light from light splitting by the fiber coupler 15 to combining by the beam splitter 41. In this case, the incident direction of the reference light may be parallel to the incident direction of the object light on the imaging plane of the imaging unit 43.

Figure 4:
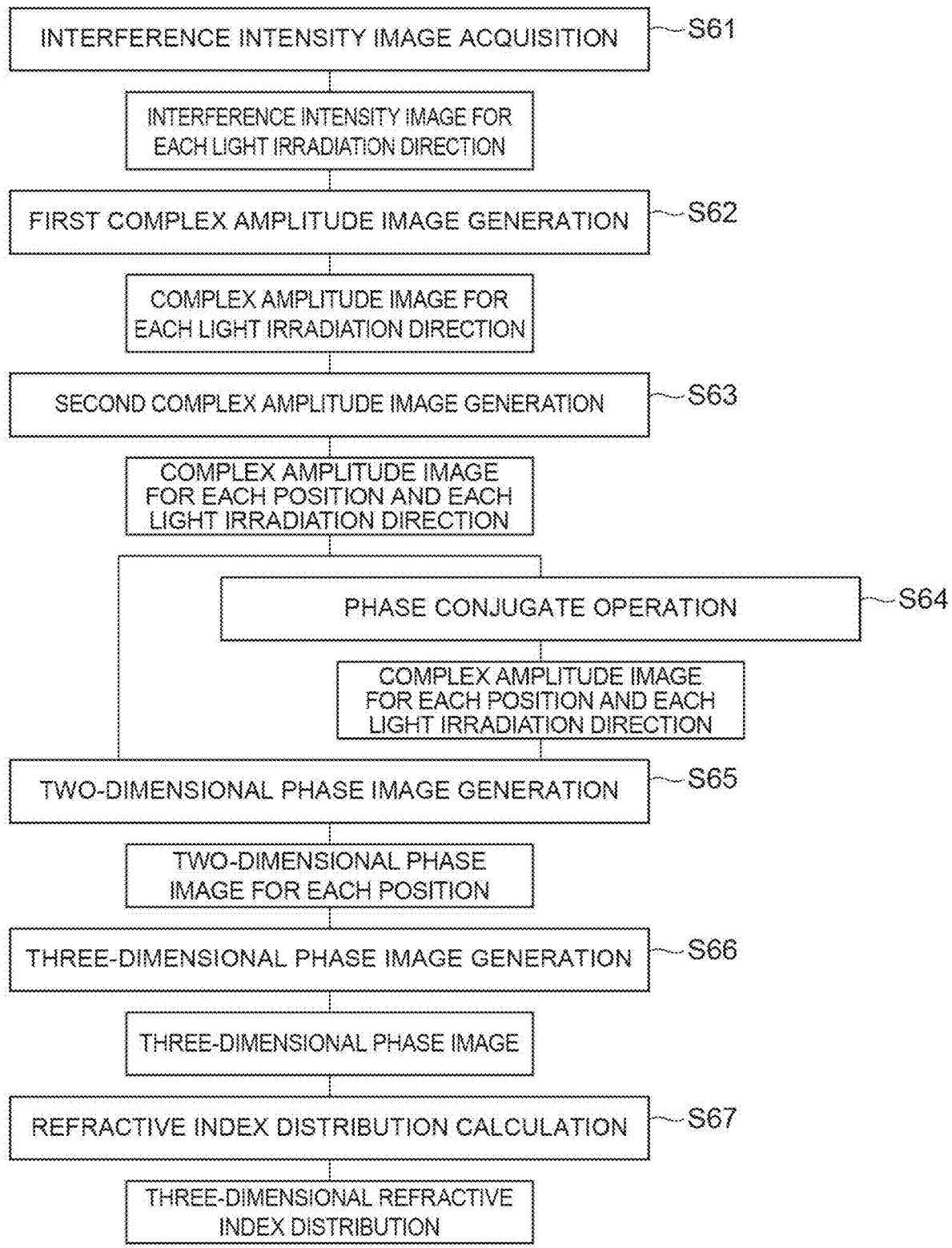
FIG. 4 is a flowchart of an observation method.

FIG. 4 is a flowchart of an observation method. This observation method can be applied to each of the observation apparatus 1A (FIG. 1), the observation apparatus 1B (FIG. 2), and the observation apparatus 1C (FIG. 3). The observation method includes an interference intensity image acquisition step S61, a first complex amplitude image generation step S62, a second complex amplitude image generation step S63, a phase conjugate operation step S64, a two-dimensional phase image generation step S65, a three-dimensional phase image generation step S66, and a refractive index distribution calculation step S67.

The processing step of the interference intensity image acquisition step S61 is performed by the interference intensity image acquisition unit 61. The processing step of the first complex amplitude image generation step S62 is performed by the first complex amplitude image generation unit 62. The processing step of the second complex amplitude image generation step S63 is performed by the second complex amplitude image generation unit 63.

The processing step of the phase conjugate operation step S64 is performed by the phase conjugate operation unit 64. The processing step of the two-dimensional phase image generation step S65 is performed by the two-dimensional phase image generation unit 65. The processing step of the three-dimensional phase image generation step S66 is performed by the three-dimensional phase image generation unit 66. The processing step of the refractive index distribution calculation step S67 is performed by the refractive index distribution calculation unit 67.

In the interference intensity image acquisition step S61, the interference intensity image acquisition unit 61 irradiates the observation object S with the light along each of the plurality of light irradiation directions by changing the orientation of the reflection surface of the mirror 22. Further, the interference intensity image acquisition unit 61 acquires the interference intensity image at the reference position for each of the plurality of light irradiation directions from the imaging unit 43.

In each of FIG. 1, FIG. 2, and FIG. 3, an xyz orthogonal coordinate system is illustrated for convenience of explanation. The z axis is parallel to the optical axis of the objective lens 25. The reference position is the image plane position having a conjugate relationship with respect to the imaging plane of the imaging unit 43. This position is set to z=0. The light irradiation direction on the observation object S can be represented by $k_x$ and $k_y$ in a wavenumber vector ($k_x$, $k_y$, $k_z$) of the irradiation light.

(a) to (c) in FIG. 5 are diagrams illustrating examples of scanning of the light irradiation direction on the observation object S in the interference intensity image acquisition step S61. In the diagram, a position of each circular point represents the light irradiation direction in the $k_x k_y$ plane in which the horizontal axis is set to $k_x$ and the vertical axis is set to $k_y$. The scanning of the light irradiation direction may be arranged in a rectangular lattice shape in the $k_x k_y$ plane as illustrated in (a) in FIG. 5, may be arranged on a circumference of each of a plurality of concentric circles in the $k_x k_y$ plane as illustrated in (b) in FIG. 5, or may be arranged in a spiral shape in the $k_x k_y$ plane as illustrated in (c) in FIG. 5.

In any of the cases, the light irradiation direction can be scanned as far as it is allowed by NA of the condenser lens 24 in the configuration of each of FIG. 1 and FIG. 2, or the objective lens 25 in the configuration of FIG. 3. Raster scan or random scan may be used. In the case of the raster scan, return scan may be performed or may not be performed.

In the first complex amplitude image generation step S62, the first complex amplitude image generation unit 62 generates, for each of the plurality of light irradiation directions, a complex amplitude image at the reference position based on the interference intensity image at the reference position acquired by the interference intensity image acquisition unit 61. In the case of the observation apparatus 1A (FIG. 1) or the observation apparatus 1C (FIG. 3), the first complex amplitude image generation unit 62 can generate the complex amplitude image based on one interference intensity image by a Fourier fringe analysis method. In the case of the observation apparatus 1B (FIG. 2), the first complex amplitude image generation unit 62 can generate the complex amplitude image based on three or more interference intensity images having different optical path differences (phase differences) between the object light and the reference light by a phase shift method.

In the second complex amplitude image generation step S63, the second complex amplitude image generation unit 63 generates, for each of the plurality of light irradiation directions, a complex amplitude image at each of a plurality of z direction positions based on the complex amplitude image at the reference position (z=0) generated by the first complex amplitude image generation unit 62.

Assuming that a two-dimensional Fourier transform of the complex amplitude image u(x, y, 0) at the reference position is $U(k_x, k_y, 0)$, the complex amplitude image u(x, y, d) at the position of z=d and the two-dimensional Fourier transform $U(k_x, k_y, d)$ of the complex amplitude image u(x, y, d) are represented by the following Formulas of free propagation. i is an imaginary unit, and ko is a wavenumber of the light in the observation object.

[Formula 1]
$$U(k_x, k_y, d) = U(k_x, k_y, 0)\exp\left(i\sqrt{k_0^2 - k_x^2 - k_y^2}\, d\right) \quad (1)$$

[Formula 2]
$$u(x, y, d) = \int U(k_x, k_y, d)\exp(-ik_x x - ik_y y)dk_x dk_y \quad (2)$$

The phase conjugate operation step S64 is performed after the processing step of the second complex amplitude image generation step S63. The phase conjugate operation step S64 may be performed before the processing step of the second complex amplitude image generation step S63 (which will be described later). Further, when the second complex amplitude image generation step S63 generates the complex amplitude image at a certain z position through a plurality of stages from the complex amplitude image at the reference position, the phase conjugate operation step S64 may be performed between a certain stage and a next stage in the plurality of stages (which will be described later).

In the phase conjugate operation step S64, the phase conjugate operation unit 64 performs a phase conjugate operation on the complex amplitude image of each of the plurality of light irradiation directions to generate a complex amplitude image of each of the plurality of light irradiation directions when the relationship between the light irradiation and the imaging for the observation object is reversed.

In addition, the phase conjugate operation is an operation for the complex amplitude image based on a phase conjugate method, and is an operation of calculating a transmission matrix representing the relationship between the light irradiation and the light output for the object, and including an inverse matrix calculation thereof and coordinate conversion. The phase conjugate method may be referred to as a phase conjugation, a time reversal method, a time reversal, a digital phase conjugation, a digital phase conjugate method, or the like. The details will be described later.

In the two-dimensional phase image generation step S65, the two-dimensional phase image generation unit 65 generates, for each of the plurality of positions, a two-dimensional phase image based on the complex amplitude image of each of the plurality of light irradiation directions generated by the second complex amplitude image generation unit 63 or the phase conjugate operation unit 64. The two-dimensional phase image generated in this step corresponds to a phase image centered on the focused z direction position.

In the two-dimensional phase image generation step S65, when a phase image generated based on the complex amplitude image before performing the processing step of the phase conjugate operation step S64 is set as a first phase image, and a phase image generated based on the complex amplitude image obtained by performing the processing step of the phase conjugate operation step S64 is set as a second phase image, for the plurality of positions, the two-dimensional phase image is generated mainly based on the first phase image at a position relatively close to the imaging unit, and the two-dimensional phase image is generated mainly based on the second phase image at a position relatively far from the imaging unit.

In addition, the phase conjugate operation unit 64 and the subsequent processing steps may be performed after all the complex amplitude images at the plurality of positions are generated for each of the plurality of light irradiation directions in the second complex amplitude image generation step S63. Further, processes of generating the complex amplitude image at one certain z direction position for each of the plurality of light irradiation directions in the second complex amplitude image generation step S63 and generating the two-dimensional phase image at the position in the two-dimensional phase image generation step S65 may be set as a unit, and the unit process may be repeatedly performed while scanning the z direction position. The latter case is preferable in that a capacity of image data to be stored in the storage unit 69 can be reduced.

In the three-dimensional phase image generation step S66, the three-dimensional phase image generation unit 66 generates a three-dimensional phase image based on the two-dimensional phase image at each of the plurality of positions generated by the two-dimensional phase image generation unit 65. The three-dimensional phase image generated in this step is an image in which the positions x and y in the two-dimensional phase image and the position z of the two-dimensional phase image are variables.

In the refractive index distribution calculation step S67, the refractive index distribution calculation unit 67 obtains a three-dimensional refractive index distribution of the observation object by deconvolution based on the three-dimensional phase image generated by the three-dimensional phase image generation unit 66.

Assuming that the refractive index distribution of the observation object is n(x, y, z), an electric susceptibility distribution is f(x, y, z), and a refractive index of a background medium is nm, there is a relationship of the following Formula (3) between them. The three-dimensional phase image $\Phi(x, y, z)$ generated by the three-dimensional phase image generation unit 66 is represented by convolution of a kernel function g(x, y, z) and the electric susceptibility distribution f(x, y, z) as shown in the following Formula (4). Therefore, the three-dimensional refractive index distribution n(x, y, z) of the observation object can be obtained by deconvolution based on the three-dimensional phase image $\Phi(x, y, z)$.

[Formula 3]

$$f(x, y, z) = k_0^2[(n(x, y, z)/n_m)^2 - 1] \qquad (3)$$

[Formula 4]

$$\Phi(x, y, z) = \int g(x-x', y-y', z-z')f(x', y', z')dx'dy'dz' \qquad (4)$$

Figure 6:
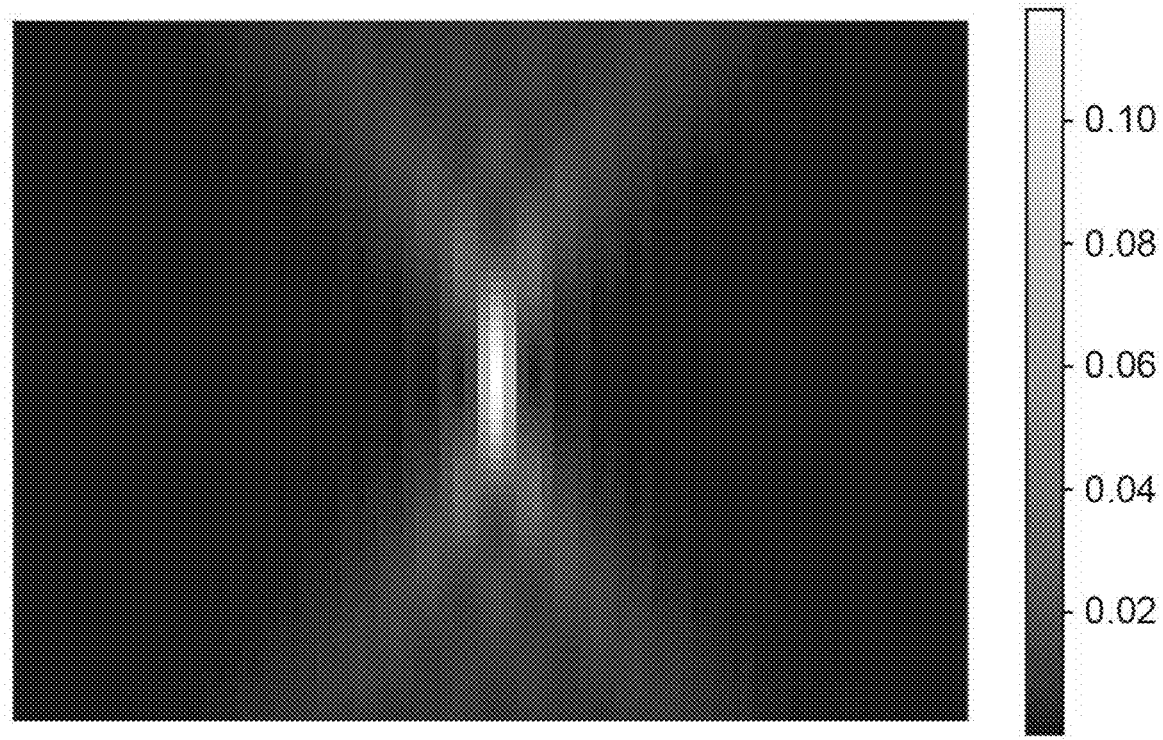
FIG. 6 is a diagram showing a kernel function g.

In addition, the kernel function g is a function based on a Green function corresponding to a solution of a wave equation. FIG. 6 is a diagram showing the kernel function g. In this diagram, a center position having the largest value of the kernel function g is the origin, the vertical direction is the z axis, and the horizontal direction is the direction perpendicular to the z axis.

Figure 8:
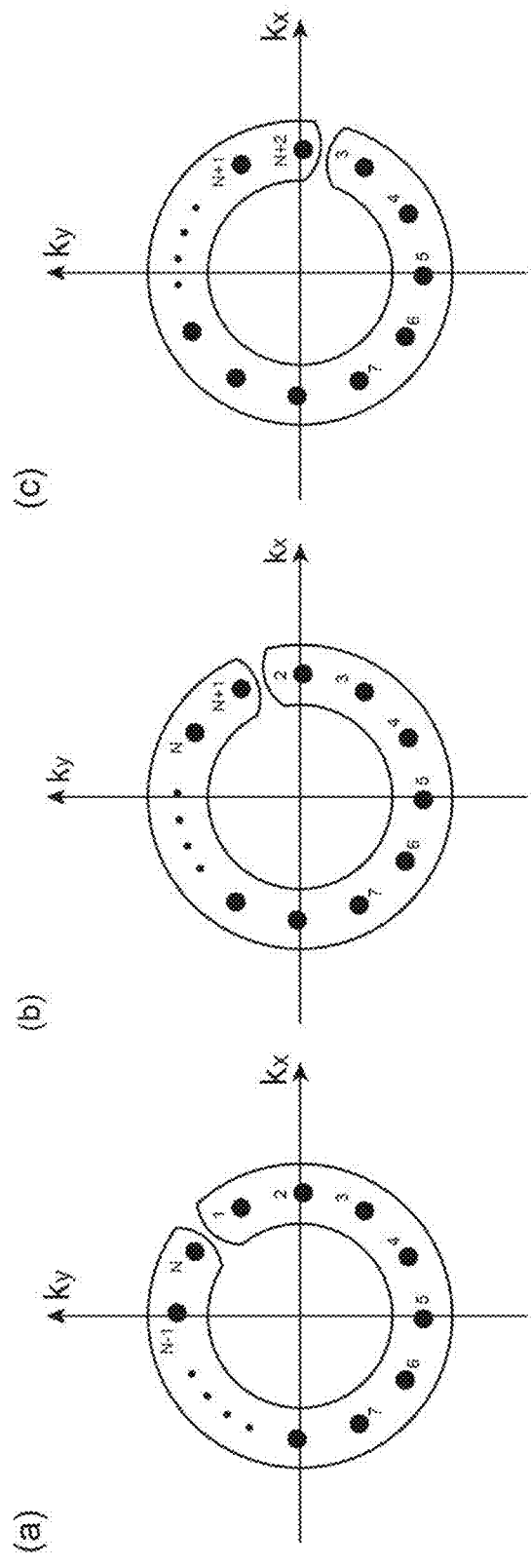
FIG. 8 includes (a)-(c) diagrams illustrating an example of scanning of the light irradiation direction on the observation object S in the interference intensity image acquisition step S61.

Each of the processing steps of the first complex amplitude image generation step S62, the second complex amplitude image generation step S63, the phase conjugate operation step S64, the two-dimensional phase image generation step S65, the three-dimensional phase image generation step S66, and the refractive index distribution calculation step S67 may be performed each time the interference intensity image of each of a predetermined number of light irradiation directions is acquired in the interference intensity image acquisition step S61 (FIG. 7), or may be performed each time the interference intensity image of one light irradiation direction is acquired in the interference intensity image acquisition step S61 (FIG. 8).

FIG. 7 and FIG. 8 are diagrams illustrating examples of scanning of the light irradiation direction on the observation object S in the interference intensity image acquisition step S61. In these diagrams, a position of each circular point represents the light irradiation direction in the $k_x k_y$ plane in which the horizontal axis is set to $k_x$ and the vertical axis is set to $k_y$. In the examples of scanning of the light irradiation direction illustrated in these diagrams, the light irradiation direction is sequentially changed, and the light irradiation direction at the time of acquisition of the (N+n)-th interference intensity image is made to coincide with the light irradiation direction at the time of acquisition of the n-th interference intensity image. n is a positive integer, and N is an integer of 2 or more.

In the example illustrated in FIG. 7, when the first to N-th interference intensity images are acquired in the interference intensity image acquisition step S61, the respective processing steps of the steps S62 to S67 are performed based on the first to N-th interference intensity images ((a) in FIG. 7). Next, when the (N+1)-th to 2N-th interference intensity images are acquired in the interference intensity image acquisition step S61, the respective processing steps of the steps S62 to S67 are performed based on the (N+1)-th to 2N-th interference intensity images ((b) in FIG. 7).

Next, when the (2N+1)-th to 3N-th interference intensity images are acquired in the interference intensity image acquisition step S61, the respective processing steps of the steps S62 to S67 are performed based on the (2N+1)-th to 3N-th interference intensity images. The same applies thereafter.

In the example illustrated in FIG. 8, when the first to N-th interference intensity images are acquired in the interference intensity image acquisition step S61, the respective processing steps of the steps S62 to S67 are performed based on the first to N-th interference intensity images ((a) in FIG. 8). Next, when the (N+1)-th interference intensity image is acquired in the interference intensity image acquisition step S61, the respective processing steps of the steps S62 to S67 are performed based on the latest N interference intensity images (the second to (N+1)-th interference intensity images) including the (N+1)-th interference intensity image ((b) in FIG. 8).

Next, when the (N+2)-th interference intensity image is acquired in the interference intensity image acquisition step S61, the respective processing steps of the steps S62 to S67 are performed based on the latest N interference intensity images (the third to (N+2)-th interference intensity images) including the (N+2)-th interference intensity image ((c) in FIG. 8). The same applies thereafter, and when the (N+n)-th interference intensity image is acquired in the interference intensity image acquisition step S61, the respective processing steps of the steps S62 to S67 are performed based on the latest N interference intensity images (the (1+n)-th to (N+n)-th interference intensity images) including the (N+n)-th interference intensity image.

Compared with the example illustrated in FIG. 7, in the example illustrated in FIG. 8, each time the interference intensity image of one light irradiation direction is acquired in the interference intensity image acquisition step S61, the respective processing steps of the steps S62 to S67 are performed based on the plurality of latest interference intensity images including the acquired interference intensity image, and thus, the number of images obtained per unit time by the respective processing steps of the steps S62 to S67 is large.

Figure 9:
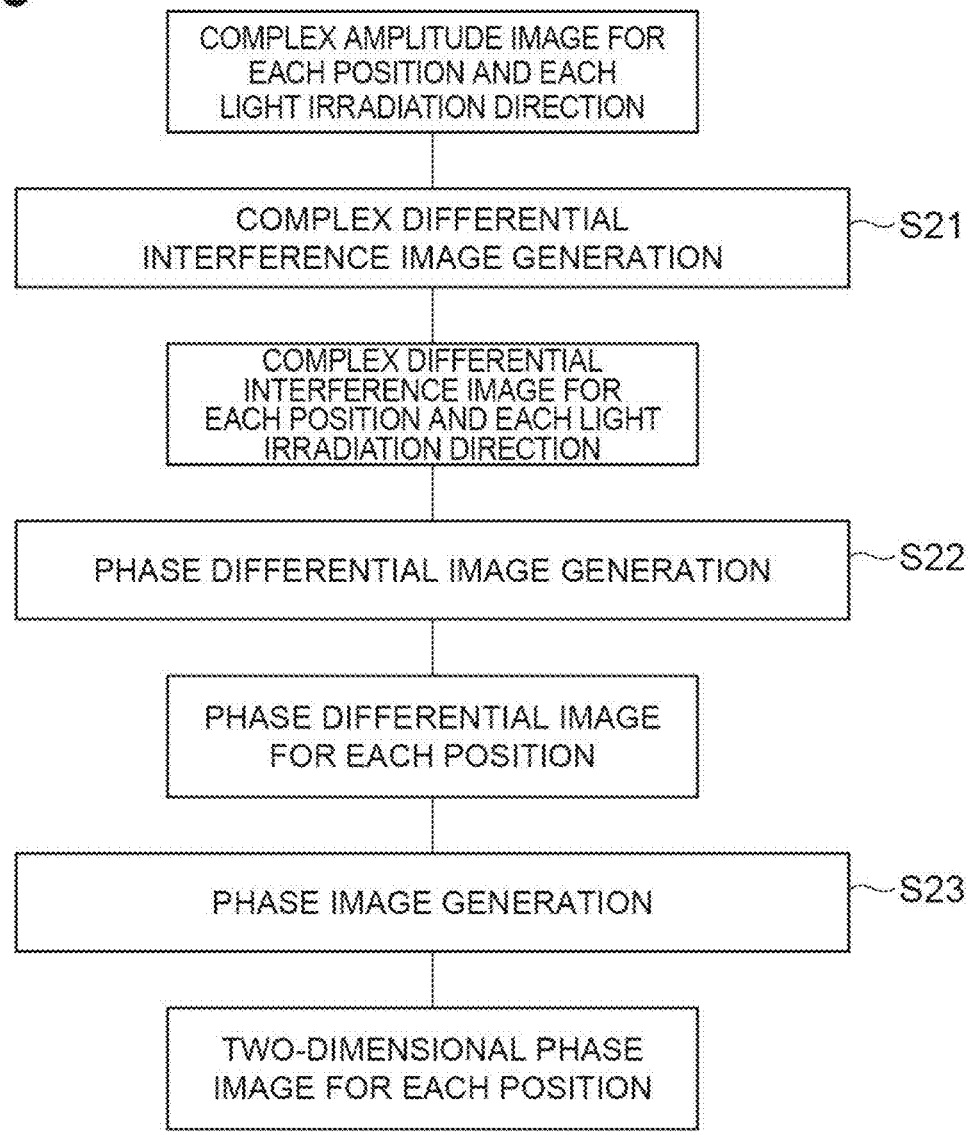
FIG. 9 is a flowchart of a two-dimensional phase image generation step S65.

Next, the details of the two-dimensional phase image generation step S65 will be described. In the two-dimensional phase image generation step S65, the two-dimensional phase image generation unit 65 generates, for each of the plurality of positions, the two-dimensional phase image based on the complex amplitude image of each of the plurality of light irradiation directions FIG. 9 is a flowchart of the two-dimensional phase image generation step S65. The two-dimensional phase image generation step S65 generates, for each of the plurality of positions, in a step S21, a complex differential interference image of each of the plurality of light irradiation directions based on the complex amplitude image of each of the plurality of light irradiation directions. In a step S22, the step generates a phase differential image based on a summation of the complex differential interference images of the plurality of light irradiation directions. In a step S23, the step generates the two-dimensional phase image based on the phase differential image.

Assuming that the complex amplitude image at the position of z=d is u(x, y, d), the complex differential interference image q(x, y, d) generated in the step S21 is represented by the following Formula (5). At least one of δx and δy is non-zero. When δx≠0 and δy=0, the complex differential interference image q in which the x direction is a shear direction is obtained. When δx≠0 and δy≠0, the complex differential interference image q in which the y direction is the shear direction is obtained. When δx≠0 and δy≠0, the complex differential interference image q with the shear direction different from both of the x direction and the y direction is obtained. In addition, the complex differential interference image q(x, y, d) may be obtained by Formula (5) after transforming the complex amplitude image u(x, y, d) as in the following Formula (6).

[Formula 5]

$$q(x, y, d) = u^*(x + \delta x, y + \delta y, d) \cdot u(x, y, d) \qquad (5)$$

[Formula 6]

$$u(x, y, d)\exp(-ik_x x - ik_y y) \quad (6)$$

Assuming that the summation of the complex differential interference images q of the plurality of light irradiation directions is $q_{sum}(x, y, d)$, the phase differential image $\phi(x, y, z)$ generated in the step S22 is represented by the following Formula (7) as the phase of $q_{sum}(x, y, d)$. In the step S23, the two-dimensional phase image can be generated by performing integration or deconvolution of the phase differential image $\phi(x, y, z)$.

[Formula 7]

$$\phi(x, y, d) = \angle q_{sum}(x, y, d) \quad (7)$$

In addition, in the step S21, the complex differential interference image may be generated for each of a plurality of shear directions different from each other on the complex amplitude image. In this case, the two-dimensional phase image generation step S65 generates, for each of the plurality of positions, in the step S21, the complex differential interference image of each of the plurality of light irradiation directions for each of the plurality of shear directions on the image different from each other based on the complex amplitude image of each of the plurality of light irradiation directions. In the step S22, the step generates the phase differential image based on the summation of the complex differential interference images of the plurality of light irradiation directions for each of the plurality of shear directions. In the step S23, the step generates the two-dimensional phase image based on the phase differential image of each of the plurality of shear directions.

The influence of the multiple scattered light is reduced in the phase differential image generated based on the summation of the complex differential interference image of each of the plurality of light irradiation directions in the step S22. Further, the three-dimensional refractive index distribution obtained finally in the refractive index distribution calculation step S67 also reduces the influence of the multiple scattered light, and suppresses the speckles. Further, when the complex differential interference image is generated for each of the plurality of shear directions different from each other on the complex amplitude image in the step S21, it is possible to suppress the appearance of linear noises in the two-dimensional phase image obtained in the step S23.

In the above description, the case in which the two-dimensional phase image is generated by performing integration or deconvolution of the phase differential image in the step S23 is described. However, the phase differential image may also be treated as the two-dimensional phase image.

Figure 10:
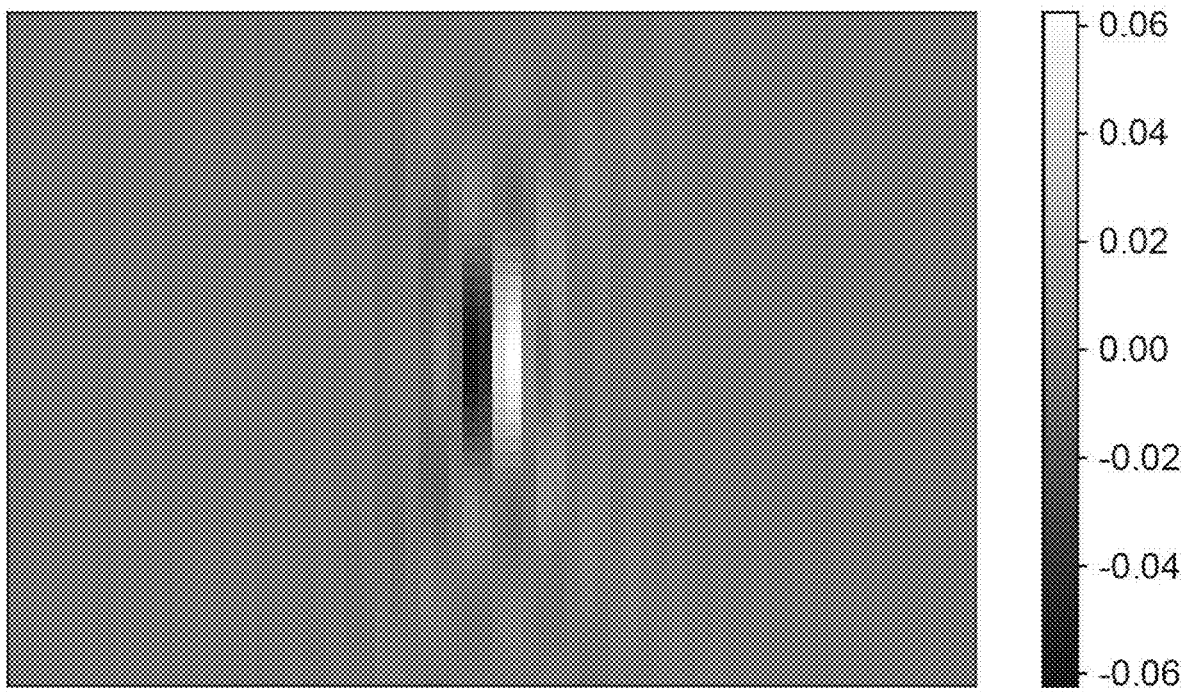
FIG. 10 is a diagram showing the kernel function.

In this case, the three-dimensional refractive index distribution of the observation object can be obtained from the phase differential image (two-dimensional phase image) generated in the step S22 by using the kernel (FIG. 10) including the kernel used in deconvolution of the step S23, in deconvolution of the refractive index distribution calculation step S67, without performing the step S23. The kernel shown in FIG. 10 is obtained by convolution integration of the kernel shown in FIG. 6 and the kernel used in deconvolution of the step S23.

Figure 11:
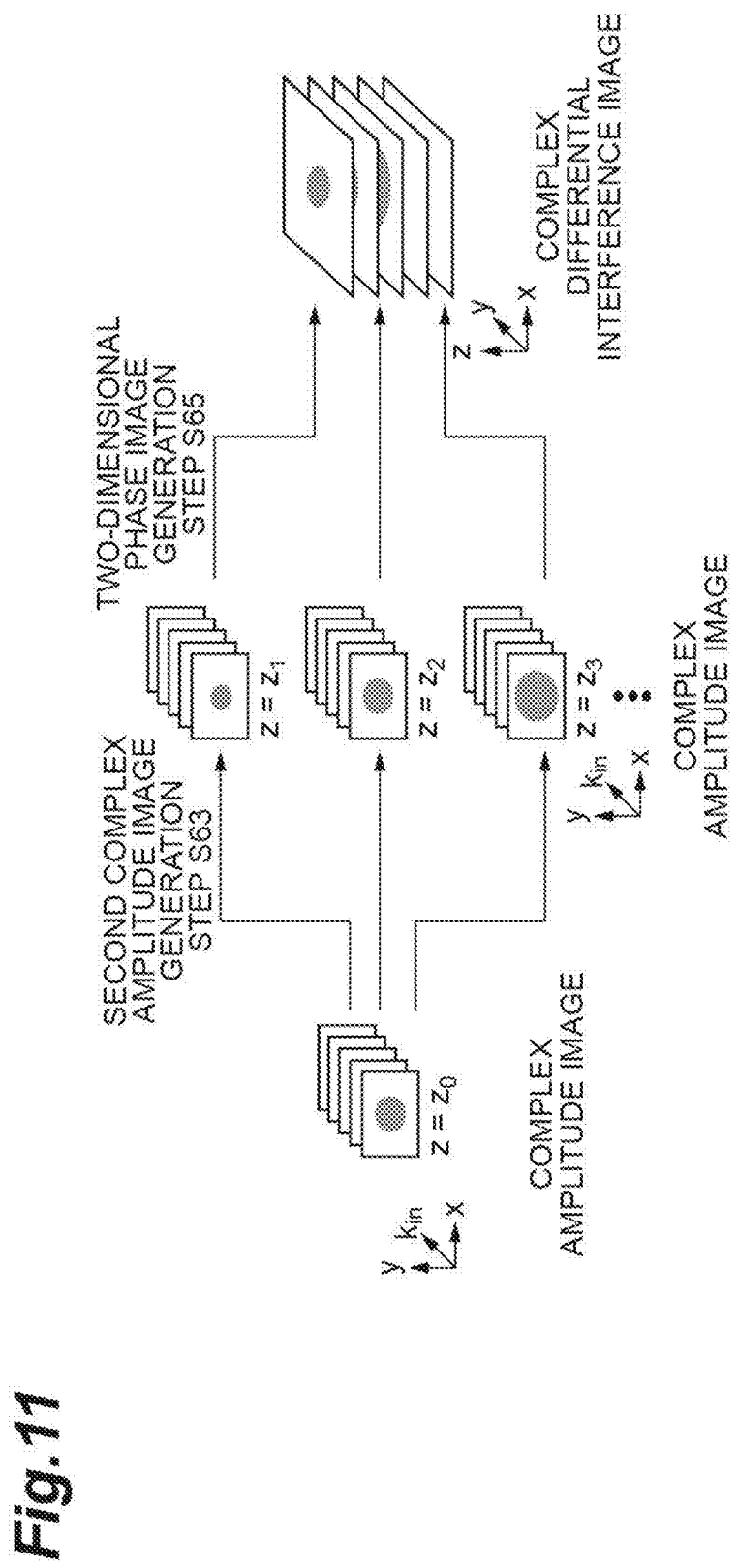
FIG. 11 is a diagram illustrating images and an order of processing steps of a second complex amplitude image generation step S63 and the two-dimensional phase image generation step S65.

FIG. 11 is a diagram illustrating the images and the order of the respective processing steps of the second complex amplitude image generation step S63 and the two-dimensional phase image generation step S65. This diagram illustrates a configuration in which the processing step of the phase conjugate operation step S64 is not performed.

In this configuration, in the second complex amplitude image generation step S63, for each of the plurality of light irradiation directions, the complex amplitude image at each of the plurality of z direction positions ($z=z_1, z_2, z_3$ in this diagram) is generated based on the complex amplitude image at the reference position ($z=0$) generated in the first complex amplitude image generation step S62 by the above Formulas (1) and (2) of the formulas of the free propagation.

Further, in the two-dimensional phase image generation step S65, for each of the plurality of positions, the complex differential interference image is generated based on the complex amplitude image of each of the plurality of light irradiation directions generated in the second complex amplitude image generation step S63, and in addition, the phase differential image is generated.

Figure 12:
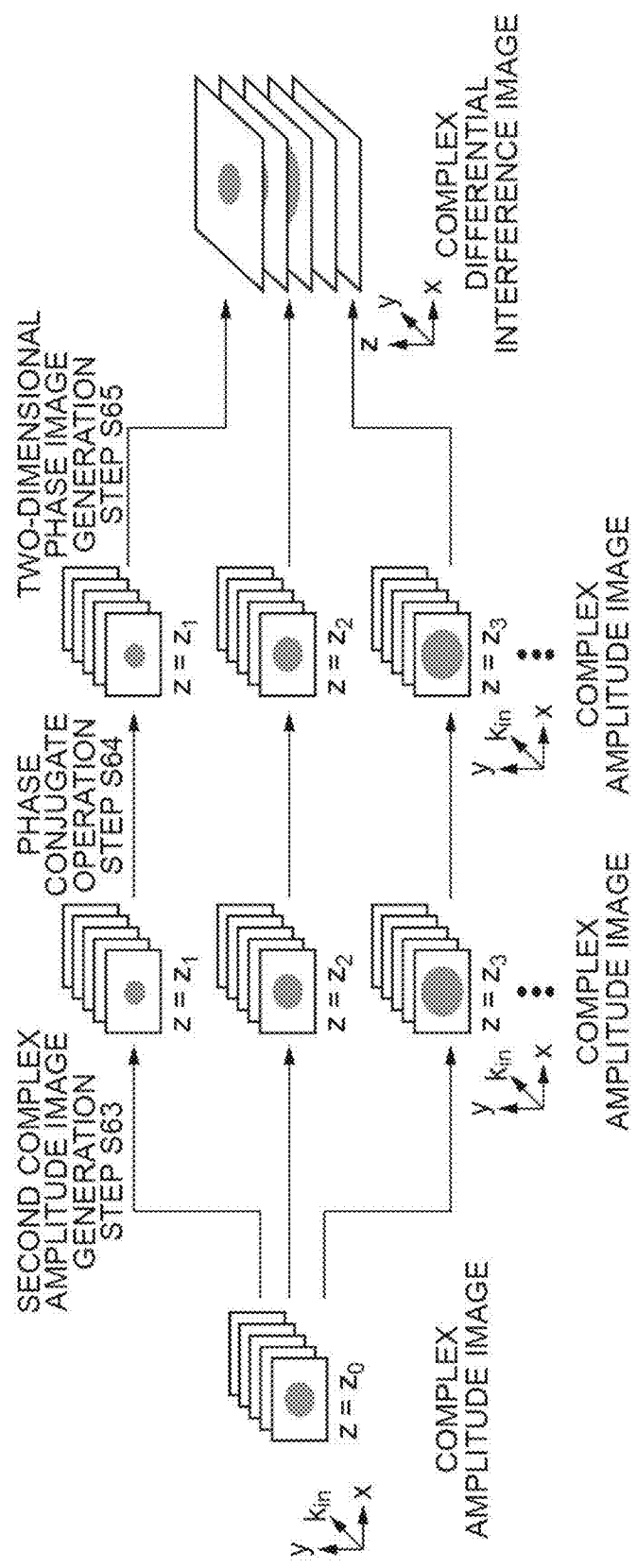
FIG. 12 is a diagram illustrating images and an order of processing steps of the second complex amplitude image generation step S63, a phase conjugate operation step S64, and the two-dimensional phase image generation step S65.
Figure 13:
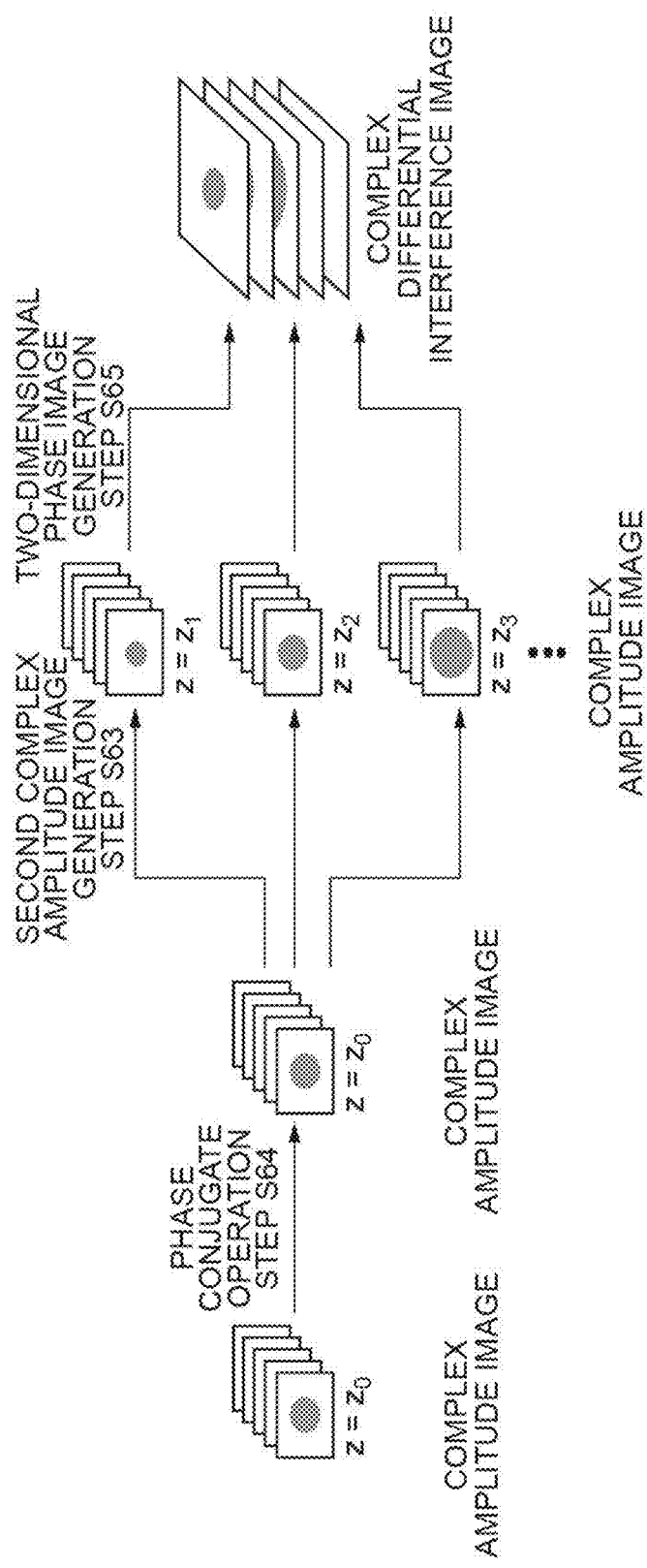
FIG. 13 is a diagram illustrating images and an order of processing steps of the second complex amplitude image generation step S63, the phase conjugate operation step S64, and the two-dimensional phase image generation step S65.
Figure 14:
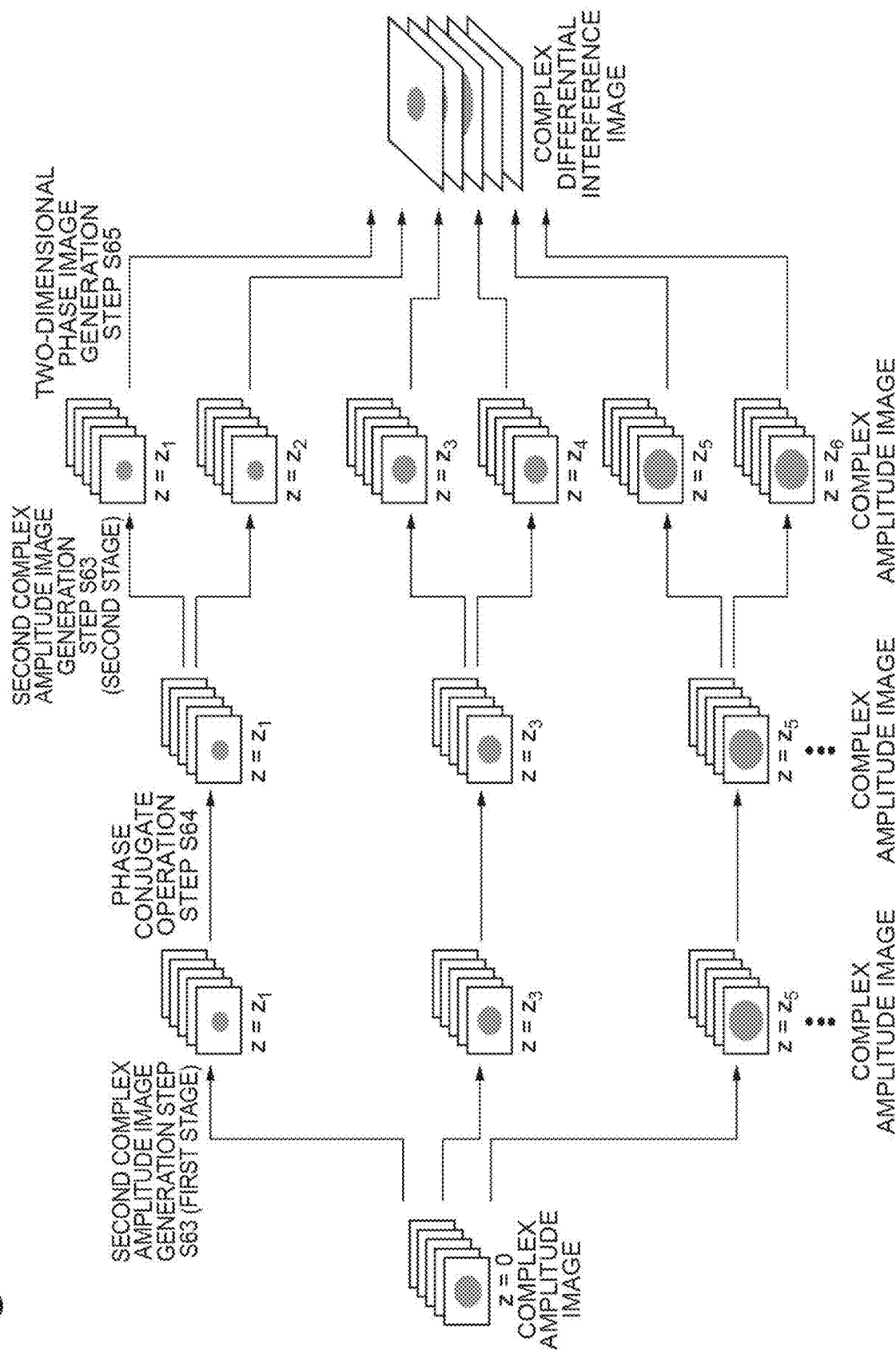
FIG. 14 is a diagram illustrating images and an order of processing steps of the second complex amplitude image generation step S63, the phase conjugate operation step S64, and the two-dimensional phase image generation step S65.

Each of FIG. 12 to FIG. 14 is a diagram illustrating the images and the order of the respective processing steps of the second complex amplitude image generation step S63, the phase conjugate operation step S64, and the two-dimensional phase image generation step S65. Each of these diagrams illustrates a configuration in which the processing step of the phase conjugate operation step S64 is performed before, during, or after the processing step of the second complex amplitude image generation step S63.

A first configuration illustrated in FIG. 12 corresponds to the flowchart illustrated in FIG. 4. In the first configuration, the phase conjugate operation step S64 is performed after the processing step of the second complex amplitude image generation step S63. In the second complex amplitude image generation step S63, for each of the plurality of light irradiation directions, the complex amplitude image at each of the plurality of z direction positions ($z=z_1, z_2, z_3$ in this diagram) is generated based on the complex amplitude image at the reference position ($z=0$) generated in the first complex amplitude image generation step S62 by the above Formulas (1) and (2) of the formulas of the free propagation.

In the first configuration, subsequently, in the phase conjugate operation step S64, for each of the plurality of positions, the phase conjugate operation is performed on the complex amplitude image of each of the plurality of light irradiation directions, and the complex amplitude image of each of the plurality of light irradiation directions in the case in which the relationship between the light irradiation and the imaging for the observation object is reversed is generated. Further, in the two-dimensional phase image generation step S65, for each of the plurality of positions, the complex differential interference image is generated based on the complex amplitude image of each of the plurality of light irradiation directions generated in the phase conjugate operation step S64, and in addition, the phase differential image is generated.

In a second configuration illustrated in FIG. 13, the phase conjugate operation step S64 is performed before the processing step of the second complex amplitude image generation step S63. In the phase conjugate operation step S64, for each of the plurality of light irradiation directions, the phase conjugate operation is performed on the complex amplitude image at the reference position ($z=0$) generated in the first complex amplitude image generation step S62, and the complex amplitude image of each of the plurality of light irradiation directions in the case in which the relationship between the light irradiation and the imaging for the observation object is reversed is generated.

In the second configuration, subsequently, in the second complex amplitude image generation step S63, for each of the plurality of light irradiation directions, the complex amplitude image at each of the plurality of z direction positions (z=$z_1$, $z_2$, $z_3$ in this diagram) is generated based on the complex amplitude image at the reference position (z=0) generated in the phase conjugate operation step S64 by the above Formulas (1) and (2) of the formulas of the free propagation. Further, in the two-dimensional phase image generation step S65, for each of the plurality of positions, the complex differential interference image is generated based on the complex amplitude image of each of the plurality of light irradiation directions generated in the second complex amplitude image generation step S63, and in addition, the phase differential image is generated.

In a third configuration illustrated in FIG. 14, in the case in which the second complex amplitude image generation step S63 generates the complex amplitude image at each of the plurality of positions from the complex amplitude image at the reference position through two stages, the phase conjugate operation step S64 is performed between a first stage and a second stage in the two stages.

In the third configuration, in the first stage of the second complex amplitude image generation step S63, for each of the plurality of light irradiation directions, the complex amplitude image at each of the plurality of z direction positions (z=$z_1$, $z_3$, $z_5$ in this diagram) is generated based on the complex amplitude image at the reference position (z=0) generated in the first complex amplitude image generation step S62 by the above Formulas (1) and (2) of the formulas of the free propagation. Subsequently, in the phase conjugate operation step S64, the phase conjugate operation is performed on the complex amplitude image of each of the plurality of light irradiation directions, and the complex amplitude image of each of the plurality of light irradiation directions in the case in which the relationship between the light irradiation and the imaging for the observation object is reversed is generated.

In the third configuration, further subsequently, in the second stage of the second complex amplitude image generation step S63, for each of the plurality of light irradiation directions, the complex amplitude image at each of the z direction positions (z=$z_2$, $z_4$, $z_6$) is generated based on the complex amplitude images at the z direction positions (z=$z_1$, $z_3$, $z_5$) generated in the phase conjugate operation step S64 by the above Formulas (1) and (2) of the formulas of the free propagation. Further, in the two-dimensional phase image generation step S65, for each of the plurality of positions, the complex differential interference image is generated based on the complex amplitude image of each of the plurality of light irradiation directions generated in the second complex amplitude image generation step S63, and in addition, the phase differential image is generated.

In the first configuration, the second configuration, and the third configuration described above, the number of times of the phase conjugate operation on the complex amplitude image in the phase conjugate operation step S64 is different. The overall processing time of the phase conjugate operation step S64 is shorter in the third configuration than in the first configuration, and is even shorter in the second configuration.

Figure 15:
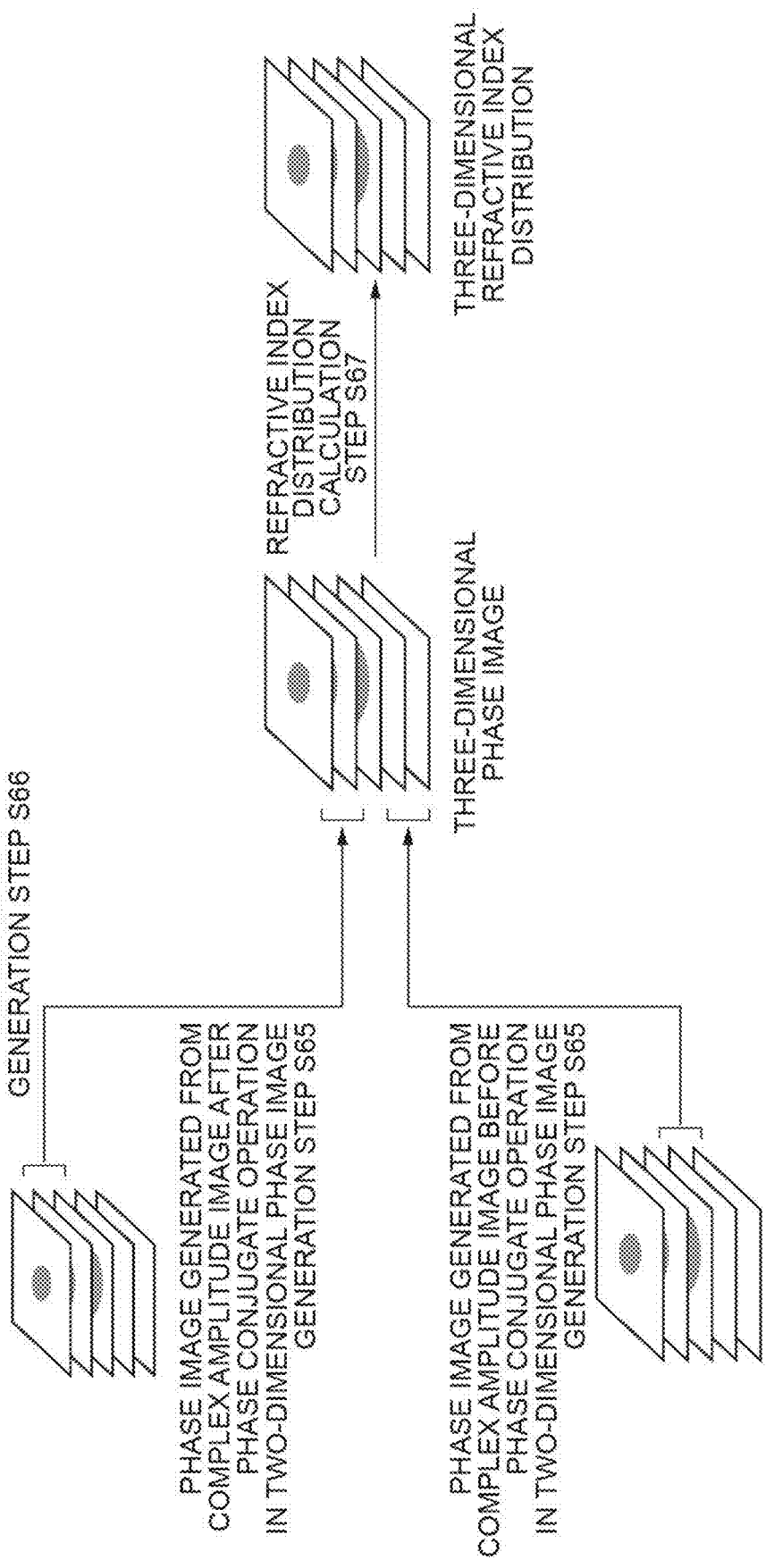
FIG. 15 is a diagram illustrating images and an order of processing steps of a three-dimensional phase image generation step S66 and a refractive index distribution calculation step S67.

FIG. 15 is a diagram illustrating the images and the order of the respective processing steps of the three-dimensional phase image generation step S66 and the refractive index distribution calculation step S67. In the three-dimensional phase image generation step S66, the three-dimensional phase image is generated based on the two-dimensional phase image of each of the plurality of positions generated in the two-dimensional phase image generation step S65.

In this case, for the position which is relatively close to the imaging unit, the two-dimensional phase image generated based on the complex amplitude image before performing the processing step of the phase conjugate operation step S64 (the two-dimensional phase image generated in the configuration illustrated in FIG. 11) is mainly used. On the other hand, for the position which is relatively far from the imaging unit, the two-dimensional phase image generated based on the complex amplitude image after performing the processing step of the phase conjugate operation step S64 (the two-dimensional phase image generated in any one of the configurations illustrated in FIG. 12 to FIG. 14) is mainly used.

Subsequently, in the refractive index distribution calculation step S67, the three-dimensional refractive index distribution of the observation object is obtained by deconvolution based on the three-dimensional phase image generated in the three-dimensional phase image generation step S66.

The generation of the two-dimensional phase image at each position in the z direction includes the following three configurations. The phase image generated based on the complex amplitude image before performing the processing step of the phase conjugate operation step S64 (the phase image generated in the configuration illustrated in FIG. 11) is set as the first phase image $\phi_1$. The phase image generated based on the complex amplitude image after performing the processing step of the phase conjugate operation step S64 (the phase image generated in any one of the configurations illustrated in FIG. 12 to FIG. 14) is set as the second phase image $\phi_2$. A weight function $\alpha$ having a differential coefficient of 0 or less with respect to the variable z representing the distance from the imaging unit along the light propagation path is used. The value of the weight function is 0 or more and 1 or less.

In the first configuration, it is assumed that the weight function $\alpha$ has a positive value (for example, 1) in a range in which z is threshold value $z_{th}$ or less, and has a value of 0 in a range other than the above range. That is, the two-dimensional phase image is represented by the following Formula (8).

[Formula 8]

$$\phi(x, y, z) = \begin{cases} \phi_1(x, y, z) & z \leq z_{th} \\ \phi_2(x, y, z) & z > z_{th} \end{cases} \quad (8)$$

In the second configuration, it is assumed that the weight function $\alpha$ is a function having a value which continuously changes in at least a partial range in the z direction. That is, the two-dimensional phase image is represented by the following Formula (9).

[Formula 9]

$$\phi(x, y, z) = \alpha(z) \cdot \phi_1(x, y, z) + [1 - \alpha(z)]\phi_2(x, y, z) \quad (9)$$

In the third configuration, it is assumed that the weight function $\alpha$ has a value according to the position (x, y) on the plane perpendicular to the optical axis (the z direction). That is, the two-dimensional phase image is represented by the following Formula (10).

[Formula 10]

$$\phi(x, y, z) = \alpha(x, y, z) \cdot \phi_1(x, y, z) + [1 - \alpha(x, y, z)]\phi_2(x, y, z) \quad (10)$$

Next, the contents of the phase conjugate operation by the phase conjugate operation step S64 will be described with reference to FIG. 16 and FIG. 17.

Figure 16:
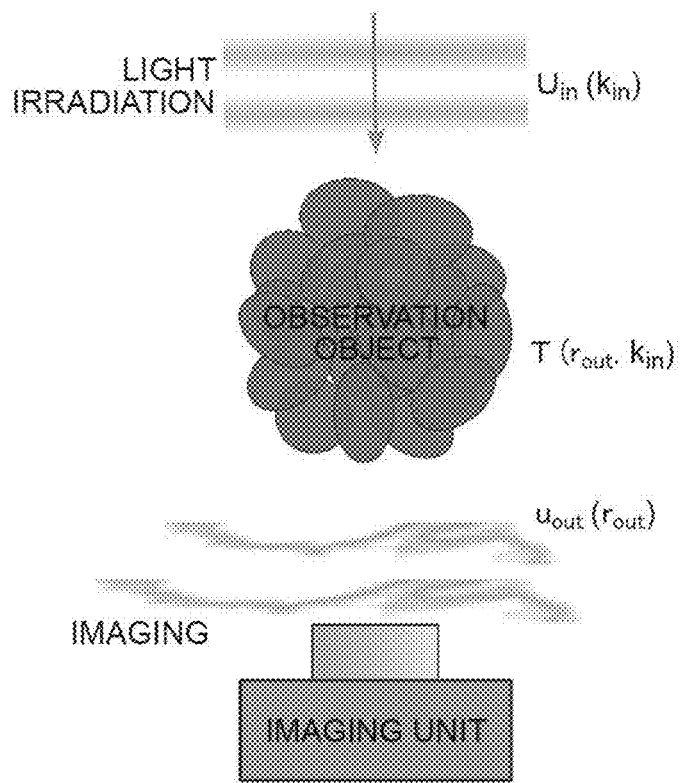
FIG. 16 is a diagram for describing an outline of a phase conjugate operation, and is the diagram illustrating input light and output light when an interference intensity image is imaged by an imaging unit.

FIG. 16 is a diagram illustrating input light $U_{in}(k_{in})$ and output light $u_{out}(r_{out})$ when the interference intensity image is imaged by the imaging unit. $U_{in}(k_{in})$ represents a complex amplitude of a wavenumber $k_{in}$ of the light with which the observation object is irradiated. $u_{out}(r_{out})$ represents a complex amplitude of a position $r_{out}$ of the light output from the observation object.

The relationship between $U_{in}(k_{in})$ and $u_{out}(r_{out})$ is represented by the following Formula (11). An n-th element $U_{in}(k_{in}^n)$ of a column vector $U_{in}$ represents a complex amplitude of a plane wave of a wavenumber of $k_{in}^n$. An n-th element $u_{out}(r_{out}^n)$ of a column vector $u_{out}$ represents a complex amplitude of the light observed at a position $r_{out}^n$. A matrix $T(r_{out}, k_{in})$ of N rows and N columns represents a linear relationship between $U_{in}(k_{in})$ and $u_{out}(r_{out})$, and is referred to as a transmission matrix. A scattering process of the light in the observation object can be represented by the transmission matrix described above. An element $T_{n1,n2}$ of an n1-th row and an n2-th column of the matrix $T(r_{out}, k_{in})$ represent a complex amplitude of the light observed at a position $r_{out}^{n1}$ when the plane wave having a wavenumber of $k_{in}^{n2}$ and an amplitude of 1 is input.

[Formula 11]

$$\begin{pmatrix} u_{out}(r_{out}^1) \\ \vdots \\ u_{out}(r_{out}^N) \end{pmatrix} = \begin{pmatrix} T(r_{out}^1, k_{in}^1) & \cdots & T(r_{out}^1, k_{in}^N) \\ \vdots & \ddots & \vdots \\ T(r_{out}^N, k_{in}^1) & \cdots & T(r_{out}^N, k_{in}^N) \end{pmatrix} \begin{pmatrix} U_{in}(k_{in}^1) \\ \vdots \\ U_{in}(k_{in}^N) \end{pmatrix} = \begin{pmatrix} T_{1,1} & \cdots & T_{1,N} \\ \vdots & \ddots & \vdots \\ T_{N,1} & \cdots & T_{N,N} \end{pmatrix} \begin{pmatrix} U_{in}(k_{in}^1) \\ \vdots \\ U_{in}(k_{in}^N) \end{pmatrix} \quad (11)$$

Figure 17:
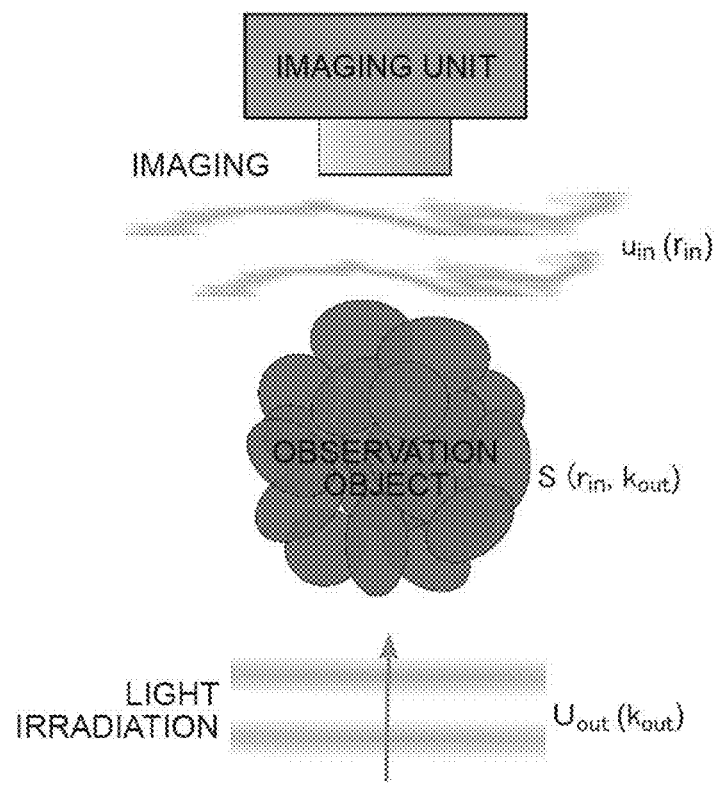
FIG. 17 is a diagram for describing the outline of the phase conjugate operation, and is the diagram illustrating input light and output light in a case in which a relationship between light irradiation and imaging is reversed.

FIG. 17 is a diagram illustrating input light $U_{out}(k_{out})$ and output light $u_{in}(r_{in})$ in the case in which the relationship between the light irradiation and the imaging is reversed. In this case, $U_{out}(k_{out})$ represents a complex amplitude of a wavenumber $k_{out}$ of the light with which the observation object is irradiated. $u_{in}(r_{in})$ represents a complex amplitude of a position $r_{in}$ of the light output from the observation object.

The relationship between $U_{out}(k_{out})$ and $u_{in}(r_{in})$ is represented by the following Formula (12). An n-th element $U_{out}(k_{out}^n)$ of a column vector $U_{out}$ represents a complex amplitude of a plane wave of a wavenumber of $k_{out}^n$. An n-th element $u_{in}(r_{in}^n)$ of a column vector $u_{in}$ represents a complex amplitude of the light observed at a position $r_{in}^n$. A matrix $S(r_{in}, k_{out})$ of N rows and N columns represents a linear relationship between $U_{out}(k_{out})$ and $u_{in}(r_{in})$, and is a transmission matrix in the case in which the relationship between the light irradiation and the imaging is reversed.

[Formula 12]

$$\begin{pmatrix} u_{in}(r_{in}^1) \\ \vdots \\ u_{in}(r_{in}^N) \end{pmatrix} = \begin{pmatrix} S(r_{in}^1, k_{out}^1) & \cdots & S(r_{in}^1, k_{out}^N) \\ \vdots & \ddots & \vdots \\ S(r_{in}^N, k_{out}^1) & \cdots & S(r_{in}^N, k_{out}^N) \end{pmatrix} \begin{pmatrix} U_{out}(k_{out}^1) \\ \vdots \\ U_{out}(k_{out}^N) \end{pmatrix} = \begin{pmatrix} S_{1,1} & \cdots & S_{1,N} \\ \vdots & \ddots & \vdots \\ S_{N,1} & \cdots & S_{N,N} \end{pmatrix} \begin{pmatrix} U_{out}(k_{out}^1) \\ \vdots \\ U_{out}(k_{out}^N) \end{pmatrix} \quad (12)$$

$U_{in}(k_{in})$ is represented by the Fourier transform of $u_{in}(r_{in})$ as shown in the following Formula (13). $U_{out}(k_{out})$ is represented by the Fourier transform of $u_{out}(r_{out})$ as shown in the following Formula (14). When Formulas (11) to (14) are used, the transmission matrix $S(r_{in}, k_{out})$ in the case in which the relationship between the light irradiation and the imaging is reversed is represented by the following Formula (15) by using a matrix representing the inverse Fourier transform and the transmission matrix $T(r_{out}, k_{in})$.

[Formula 13]

$$\begin{pmatrix} U_{in}(k_{in}^1) \\ \vdots \\ U_{in}(k_{in}^N) \end{pmatrix} = \begin{pmatrix} F_{1,1} & \cdots & F_{1,N} \\ \vdots & \ddots & \vdots \\ F_{N,1} & \cdots & F_{N,N} \end{pmatrix} \begin{pmatrix} u_{in}(r_{in}^1) \\ \vdots \\ u_{in}(r_{in}^N) \end{pmatrix} \quad (13)$$

[Formula 14]

$$\begin{pmatrix} U_{out}(k_{out}^1) \\ \vdots \\ U_{out}(k_{out}^N) \end{pmatrix} = \begin{pmatrix} F_{1,1} & \cdots & F_{1,N} \\ \vdots & \ddots & \vdots \\ F_{N,1} & \cdots & F_{N,N} \end{pmatrix} \begin{pmatrix} u_{out}(r_{out}^1) \\ \vdots \\ u_{out}(r_{out}^N) \end{pmatrix} \quad (14)$$

[Formula 15]

$$\begin{pmatrix} S_{1,1} & \cdots & S_{1,N} \\ \vdots & \ddots & \vdots \\ S_{N,1} & \cdots & S_{N,N} \end{pmatrix} = \begin{pmatrix} F_{1,1} & \cdots & F_{1,N} \\ \vdots & \ddots & \vdots \\ F_{N,1} & \cdots & F_{N,N} \end{pmatrix}^{-1} \begin{pmatrix} T_{1,1} & \cdots & T_{1,N} \\ \vdots & \ddots & \vdots \\ T_{N,1} & \cdots & T_{N,N} \end{pmatrix}^{-1} \begin{pmatrix} F_{1,1} & \cdots & F_{1,N} \\ \vdots & \ddots & \vdots \\ F_{N,1} & \cdots & F_{N,N} \end{pmatrix}^{-1} \quad (15)$$

In the phase conjugate operation step S64, first, the transmission matrix $T(r_{out}, k_{in})$ when the interference intensity image is imaged by the imaging unit is obtained based on the complex amplitude image. Next, based on the above transmission matrix $T(r_{out}, k_{in})$ and the above Formula (15), the transmission matrix $S(r_{in}, k_{out})$ in the case in which the relationship between the light irradiation and the imaging is reversed is obtained. Further, based on the above transmission matrix $S(r_{in}, k_{out})$, the complex amplitude image in the case in which the relationship between the light irradiation and the imaging is reversed is obtained.

The vector $U_{in}^n(k_{in})$ of the input light of the n-th light irradiation direction when the interference intensity image is imaged by the imaging unit for each of the plurality of light irradiation directions is represented by the following Formula (16), in which only the value of the n-th element is 1 and the values of the other elements are 0. For the above input light $U_{in}^n(k_{in})$, the output light $u_{out}^n(r_{out})$ is represented by the following Formula (17). The Formula (17) corresponds to the complex amplitude obtained for the n-th light irradiation direction.

[Formula 16]

$$U_{in}^n(k_{in}) = \begin{pmatrix} U_{in}^n(k_{in}^1) \\ \vdots \\ U_{in}^n(k_{in}^N) \end{pmatrix} = \begin{pmatrix} 0 \\ \vdots \\ 0 \\ 1 \\ 0 \\ \vdots \\ 0 \end{pmatrix} \quad (16)$$

[Formula 17]

$$u_{out}^n(r_{out}) = \begin{pmatrix} u_{out}^n(r_{out}^1) \\ \vdots \\ u_{out}^n(r_{out}^N) \end{pmatrix} \quad (17)$$

From the Formula (16) and the above Formula (11), the following Formula (18) is obtained. Further, the following Formula (19) is obtained by similarly obtaining for each of the plurality of light irradiation directions. In this way, the transmission matrix $T(r_{out}, k_{in})$ can be obtained. In addition, from the Formula (19) and the above Formula (15), the transmission matrix $S(r_{in}, k_{out})$ in the case in which the relationship between the light irradiation and the imaging is reversed can be obtained.

[Formula 18]

$$\begin{pmatrix} u_{out}(r_{out}^1) \\ \vdots \\ u_{out}(r_{out}^N) \end{pmatrix} = \begin{pmatrix} T_{1,1} & \cdots & T_{1,N} \\ \vdots & \ddots & \vdots \\ T_{N,1} & \cdots & T_{N,N} \end{pmatrix} \begin{pmatrix} U_{in}(k_{in}^1) \\ \vdots \\ U_{in}(k_{in}^N) \end{pmatrix} = \begin{pmatrix} T_{1,n} \\ \vdots \\ T_{N,n} \end{pmatrix} \quad (18)$$

[Formula 19]

$$\begin{pmatrix} T_{1,1} & \cdots & T_{1,N} \\ \vdots & \ddots & \cdots \\ T_{N,1} & \cdots & T_{N,N} \end{pmatrix} = \begin{pmatrix} u_{out}^1(r_{out}^1) & \cdots & u_{out}^N(r_{out}^1) \\ \cdots & \ddots & \cdots \\ u_{out}^1(r_{out}^N) & \cdots & u_{out}^N(r_{out}^N) \end{pmatrix} \quad (19)$$

The input light $U_{out}^n(k_{out})$ of the n-th light irradiation direction out of the plurality of light irradiation directions in the case in which the relationship between the light irradiation and the imaging is reversed is represented by the following Formula (20), in which only the value of the n-th element is 1 and the values of the other elements are 0. From this Formula, the output light $u_{in}^n(r_{in})$ for the input light $U_{out}^n(k_{out})$ is represented by the following Formula (21). The Formula (21) represents the complex amplitude when the relationship between the light irradiation and the imaging is reversed. In this way, the complex amplitude image in the case in which the relationship between the light irradiation and the imaging is reversed can be obtained.

[Formula 20]

$$U_{out}^n(k_{out}) = \begin{pmatrix} U_{out}^n(k_{out}^1) \\ \vdots \\ U_{out}^n(k_{out}^N) \end{pmatrix} = \begin{pmatrix} 0 \\ \vdots \\ 0 \\ 1 \\ 0 \\ \vdots \\ 0 \end{pmatrix} \quad (20)$$

[Formula 21]

$$\begin{pmatrix} u_{in}(r_{in}^1) \\ \vdots \\ u_{in}(r_{in}^N) \end{pmatrix} = \begin{pmatrix} S_{1,1} & \cdots & S_{1,N} \\ \vdots & \ddots & \vdots \\ S_{N,1} & \cdots & S_{N,N} \end{pmatrix} \begin{pmatrix} U_{out}(k_{out}^1) \\ \vdots \\ U_{out}(k_{out}^N) \end{pmatrix} = \begin{pmatrix} S_{1,n} \\ \vdots \\ S_{N,n} \end{pmatrix} \quad (21)$$

When the transmission matrix $S(r_{in}, k_{out})$ in the case in which the relationship between the light irradiation and the imaging is reversed is obtained, it is necessary to calculate the inverse matrix of the transmission matrix $T(r_{out}, k_{in})$ as shown in the above Formula (15). Therefore, the transmission matrix T needs to be a square matrix in which the number of row elements and the number of column elements are equal to each other. That is, a matrix dimension in a light irradiation side wavenumber space for the observation object in the interference intensity image acquisition step S61 and the number of pixels of the complex amplitude image need to be equal to each other.

In order to make them equal to each other, the matrix dimension in the light irradiation side wavenumber space for the observation object in the interference intensity image acquisition step S61 may be made equal to the number of pixels, or only a partial range of the image acquired by the imaging unit may be used in the subsequent processing steps. However, in general, the number of pixels of the image acquired by the imaging unit is, for example, 1024× 1024, and thus, it is not easy to make the matrix dimension in the light irradiation side wavenumber space for the observation object equal to the number of pixels. Further, it is not preferable to use only the partial range of the image out of the image acquired by the imaging unit in the subsequent processing steps because this leads to a decrease in resolution.

Figure 18:
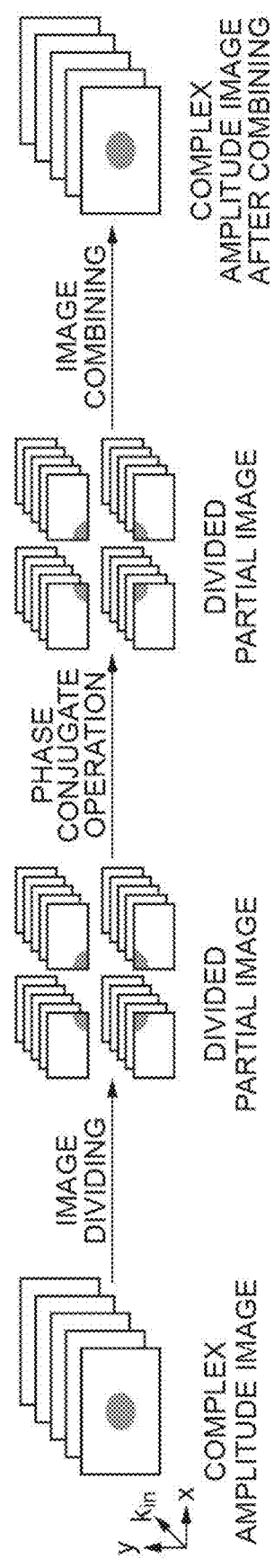
FIG. 18 is a diagram illustrating image dividing, the phase conjugate operation, and image combining in the phase conjugate operation step S64.

Therefore, as illustrated in FIG. 18, in the phase conjugate operation step S64, it is preferable to divide the complex amplitude image into a plurality of partial images each having the same number of pixels as the matrix dimension in the light irradiation side wavenumber space for the observation object, perform the phase conjugate operation on each of the plurality of partial images, and then combine the plurality of partial images. In this case, any two or more partial images out of the plurality of partial images may have a common region.

Next, simulation results will be described. Simulations A to D described below were performed according to the procedures illustrated in FIG. 4 and FIG. 12.

Figure 19:
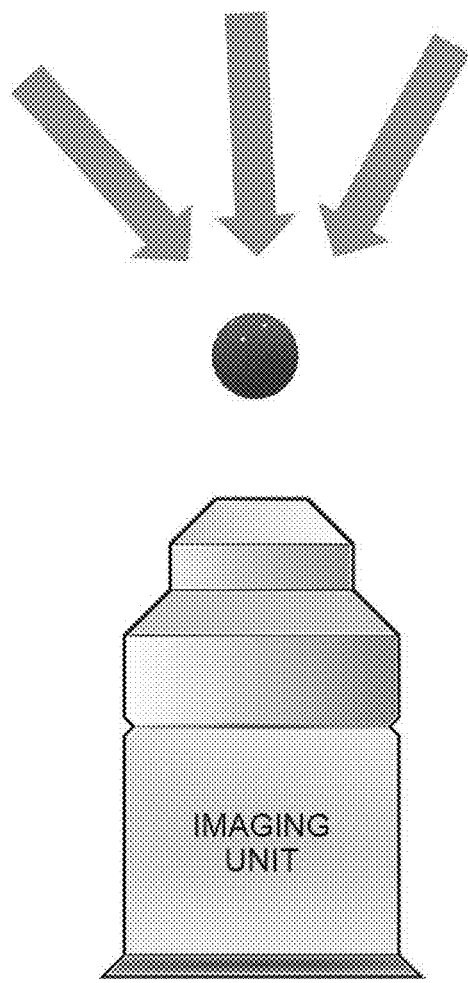
FIG. 19 is a diagram schematically illustrating an arrangement in a simulation A.

In the simulation A, as illustrated in FIG. 19, a transparent sphere was used as the observation object, the matrix dimension in the light irradiation side wavenumber space for the observation object was set to various values, and the simulation was performed on the influence of the relationship between the matrix dimension in the light irradiation side wavenumber space and the number of pixels of the image on the result of the phase conjugate operation. FIG. 19 is a diagram schematically illustrating an arrangement in the simulation. In this case, the number of pixels was set to 108×108, and the matrix dimension in the light irradiation side wavenumber space was set to each of 108×108, 54×54, 27×27, and 18×18, and the phase conjugate operation was performed.

(a) in FIG. 20 is a phase image obtained by performing the phase conjugate operation in the case in which the matrix dimension in the light irradiation side wavenumber space is set to 108×108. When the number of pixels of the image and the matrix dimension in the light irradiation side wavenumber space are equal to each other, a ghost does not appear in the phase image. (b) in FIG. 20 is a phase image obtained by performing the phase conjugate operation in the case in which the matrix dimension in the light irradiation side wavenumber space is set to 54×54. When the matrix dimension in the light irradiation side wavenumber space is smaller than the number of pixels of the image, a ghost appears in the phase image obtained by performing the phase conjugate operation. As the matrix dimension in the light irradiation side wavenumber space is smaller, the number of ghosts appearing in the phase image is larger.

Figure 21:
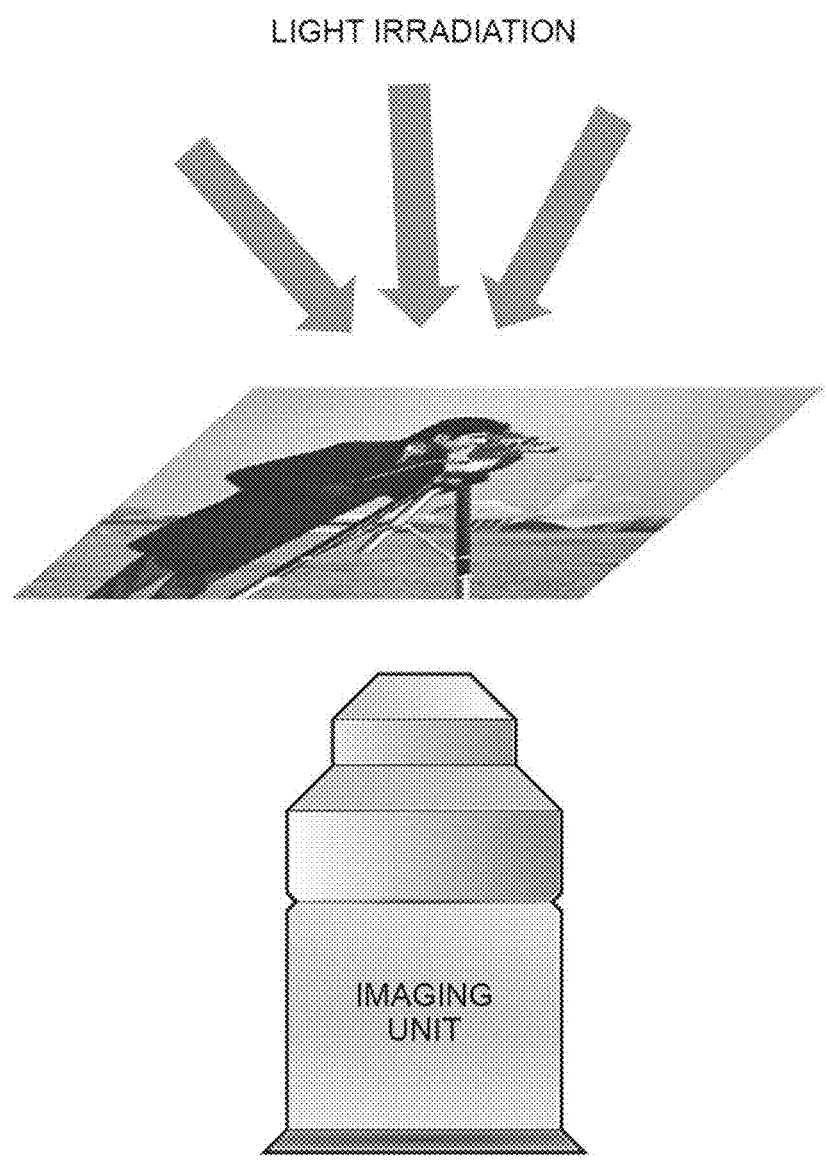
FIG. 21 is a diagram schematically illustrating an arrangement in a simulation B.

In the simulation B, as illustrated in FIG. 21, a phase image was used as the observation object, the matrix dimension in the light irradiation side wavenumber space for the observation object was set to various values, and the simulation was performed on the influence of the relationship between the matrix dimension in the light irradiation side wavenumber space and the number of pixels of the image on the result of the phase conjugate operation. FIG. 21 is a diagram schematically illustrating an arrangement in the simulation. In this case also, the number of pixels was set to 108×108, and the matrix dimension in the light irradiation side wavenumber space was set to each of 108×108, 54×54, 27×27, and 18×18, and the phase conjugate operation was performed.

(a) in FIG. 22 is a phase image obtained by performing the phase conjugate operation in the case in which the matrix dimension in the light irradiation side wavenumber space is set to 108×108. When the number of pixels of the image and the matrix dimension in the light irradiation side wavenumber space are equal to each other, a ghost does not appear in the phase image. (b) in FIG. 22 is a phase image obtained by performing the phase conjugate operation in the case in which the matrix dimension in the light irradiation side wavenumber space is set to 54×54. When the matrix dimension in the light irradiation side wavenumber space is smaller than the number of pixels of the image, a ghost appears in the phase image obtained by performing the phase conjugate operation. As the matrix dimension in the light irradiation side wavenumber space is smaller, the number of ghosts appearing in the phase image is larger. Further, a plurality of ghost images overlap each other.

As can be seen from the results of the simulations A and B, the matrix dimension in the light irradiation side wavenumber space for the observation object in the interference intensity image acquisition step S61 and the number of pixels of the complex amplitude image need to be equal to each other. Therefore, in the phase conjugate operation step S64, it is preferable to divide the complex amplitude image into the plurality of partial images each having the same number of pixels as the matrix dimension in the light irradiation side wavenumber space for the observation object, perform the phase conjugate operation on each of the plurality of partial images, and then combine the plurality of partial images.

In the simulation C, a transparent sphere was used as the observation object, the matrix dimension in the light irradiation side wavenumber space for the observation object was set to various values, and the simulation was performed on the influence of whether or not the imaging unit is focused on the observation object on the result of the phase conjugate operation. In this case, the number of pixels was set to 108×108, and the matrix dimension in the light irradiation side wavenumber space was set to each of 108×108 and 36×36, and the phase conjugate operation was performed. In the case in which the matrix dimension in the light irradiation side wavenumber space was set to 36×36, the phase conjugate operation was performed by dividing the complex amplitude image into nine partial images. In this case, the phase image was generated from the complex amplitude image without passing through the complex differential interference image.

(a) in FIG. 23 is a phase image obtained by performing the phase conjugate operation when the matrix dimension in the light irradiation side wavenumber space is set to 108×108 in the case in which the imaging unit is focused on the observation object. (b) in FIG. 23 is a phase image obtained by performing the phase conjugate operation when the matrix dimension in the light irradiation side wavenumber space is set to 36×36 in the case in which the imaging unit is focused on the observation object.

(a) in FIG. 24 is a phase image obtained by performing the phase conjugate operation when the matrix dimension in the light irradiation side wavenumber space is set to 108×108 in the case in which the imaging unit is not focused on the observation object. (b) in FIG. 24 is a phase image obtained by performing the phase conjugate operation when the matrix dimension in the light irradiation side wavenumber space is set to 36×36 in the case in which the imaging unit is not focused on the observation object.

As can be seen from the result of the simulation C, even when the matrix dimension in the light irradiation side wavenumber space is smaller than the number of pixels, by performing the phase conjugate operation by dividing the complex amplitude image into the plurality of partial images each having the same number of pixels as the matrix dimension in the light irradiation side wavenumber space, it is possible to suppress the appearance of ghosts in the phase image obtained by performing the phase conjugate operation.

However, when the imaging unit is not focused on the observation object, noises rather than ghosts appear in the phase image obtained by performing the phase conjugate operation. It is considered that the above noise is caused by a scattered wave which spreads out from a partial image to another partial image in scattered waves generated from the same scattering object. The above noise can be suppressed by generating the phase image from the complex amplitude image through the complex differential interference image. By passing through the complex differential interference image, the light from a position other than the focus plane can be removed.

Figure 25:
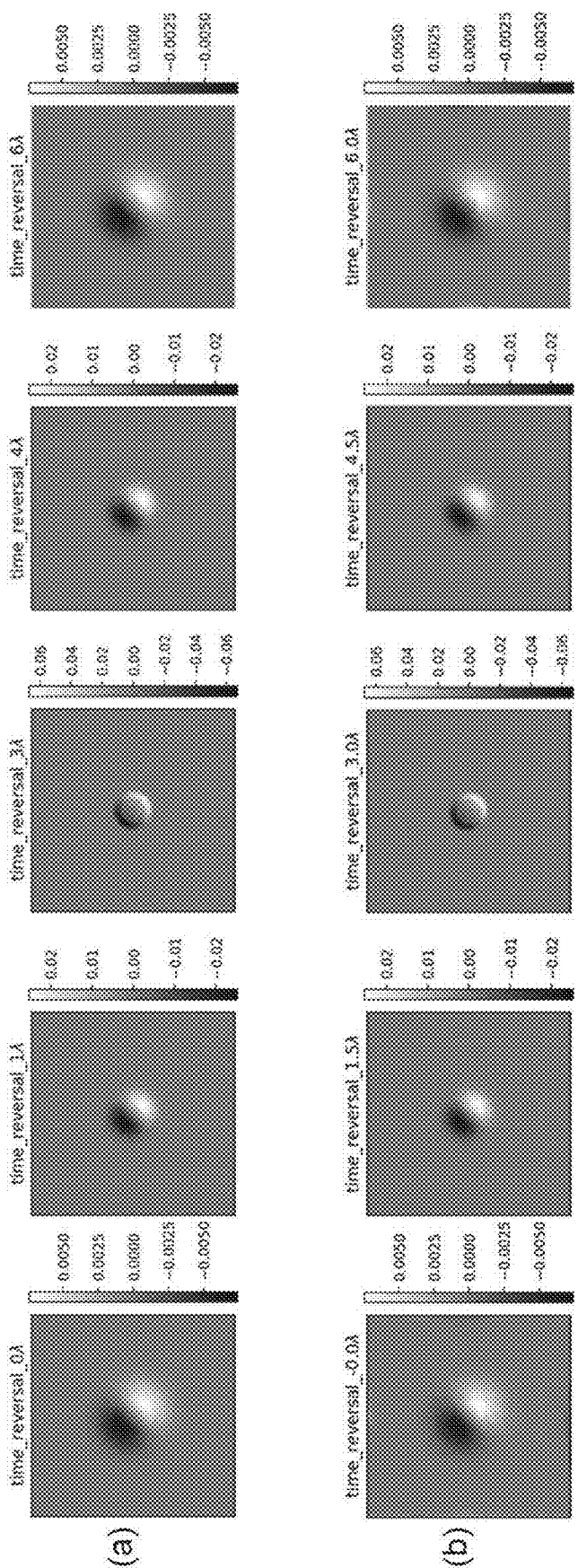
FIG. 25 includes (a) phase differential images obtained by performing the phase conjugate operation when the matrix dimension in the light irradiation side wavenumber space is set to 108×108, and (b) phase differential images obtained by performing the phase conjugate operation when the matrix dimension in the light irradiation side wavenumber space is set to 36×36.

(a) in FIG. 25 includes phase differential images obtained by performing the phase conjugate operation when the matrix dimension in the light irradiation side wavenumber space is set to 108×108. (b) in FIG. 25 includes phase differential images obtained by performing the phase conjugate operation when the matrix dimension in the light irradiation side wavenumber space is set to 36×36. In each of (a) in FIG. 25 and (b) in FIG. 25, five phase differential images having z direction positions different from each other are shown. As shown in these diagrams, even when the phase conjugate operation is performed by dividing the complex amplitude image into the plurality of partial images, the same phase differential images as those in the case in which the phase conjugate operation is performed without dividing the image can be obtained.

Figure 26:
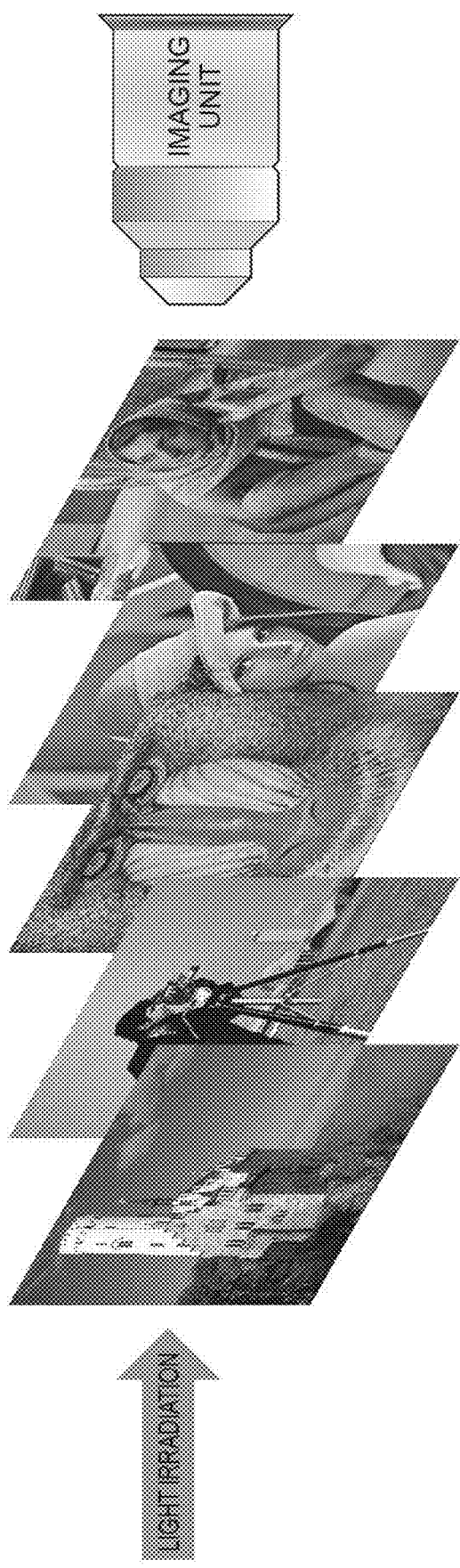
FIG. 26 is a diagram schematically illustrating an arrangement in a simulation D.

In the simulation D, a configuration in which five types of phase images were arranged in parallel at regular intervals was used as the observation object, and the simulation was performed. FIG. 26 is a diagram schematically illustrating an arrangement in the simulation. In this case, the number of pixels was set to 360×360, and the matrix dimension in the light irradiation side wavenumber space was set to 36×36. The phase conjugate operation was performed by dividing the complex amplitude image into 100 partial images.

Figure 27:
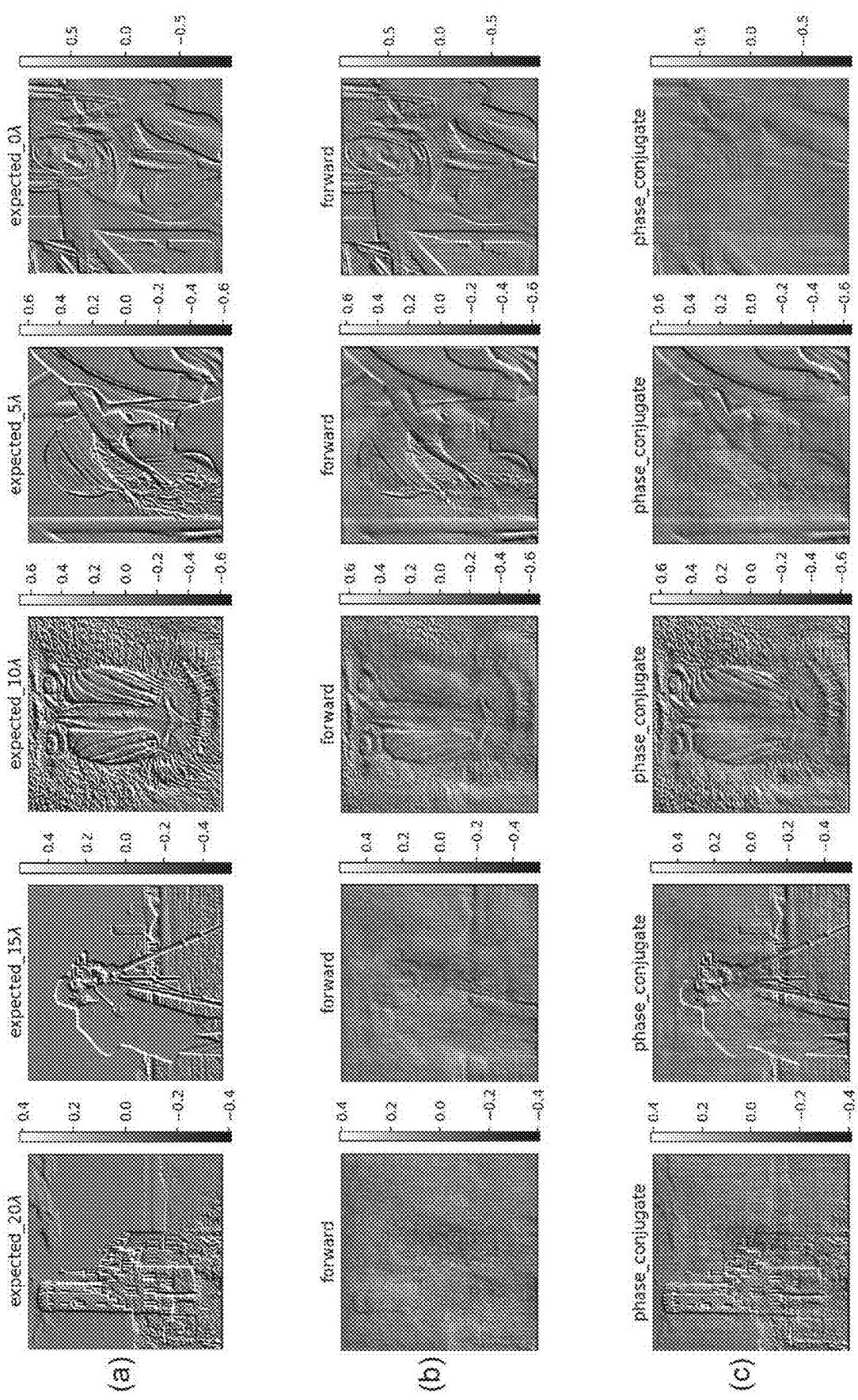
FIG. 27 includes (a) phase differential images of an exact solution, (b) phase differential images obtained in a case in which the phase conjugate operation is not performed, and (c) phase differential images obtained in a case in which the phase conjugate operation is performed.

(a) in FIG. 27 includes phase differential images of an exact solution. (b) in FIG. 27 includes phase differential images obtained in the case in which the phase conjugate operation is not performed. (c) in FIG. 27 includes phase differential images obtained in the case in which the phase conjugate operation is performed.

As shown in (b) in FIG. 27, the phase differential image obtained in the case in which the phase conjugate operation is not performed is clear as it is closer to the imaging unit, and is unclear as it is farther from the imaging unit. On the other hand, as shown in (c) in FIG. 27, the phase differential image obtained in the case in which the phase conjugate operation is performed is unclear as it is closer to the imaging unit, and is clear as it is farther from the imaging unit.

Therefore, the degree of depth in the observation of the observation object can be improved by mainly using the phase image generated based on the complex amplitude image before performing the phase conjugate operation for the position relatively close to the imaging unit, and mainly using the phase image generated based on the complex amplitude image after performing the phase conjugate operation for the position relatively far from the imaging unit.

Next, an example will be described. In this example, the observation apparatus 1A (FIG. 1) was used, and the Fourier fringe analysis method was adopted. In the step S21, the complex differential interference image was generated for each of the two different shear directions (vertical direction shear and horizontal direction shear) on the complex amplitude image. The procedures illustrated in FIG. 4 and FIG. 12 were used.

A spheroid of a three-dimensional culture of the human liver cancer-derived HepG2 was used as the observation object. The number of pixels was set to 600×600. The matrix dimension in the light irradiation side wavenumber space for the observation object was set to 50×50. The phase conjugate operation was performed by dividing the complex amplitude image into 144 partial images. FIG. 28 to FIG. 44 are diagrams showing examples of the images obtained in the respective steps.

Figure 28:
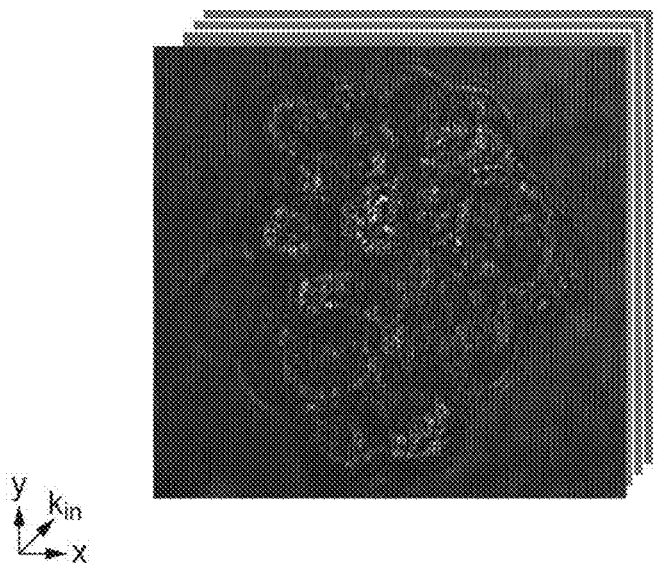
FIG. 28 is an interference intensity image (with vertical irradiation) acquired in the interference intensity image acquisition step S61.
Figure 29:
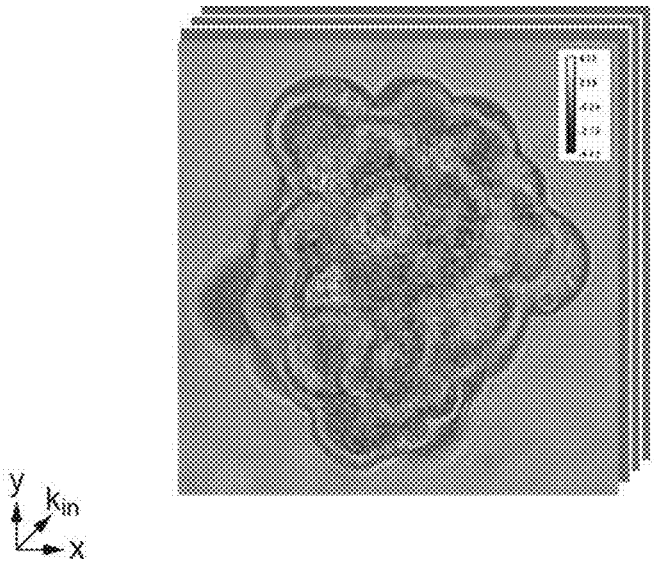
FIG. 29 is a complex amplitude image (real part, z=0) generated based on the interference intensity image (FIG. 28) in a first complex amplitude image generation step S62.
Figure 30:
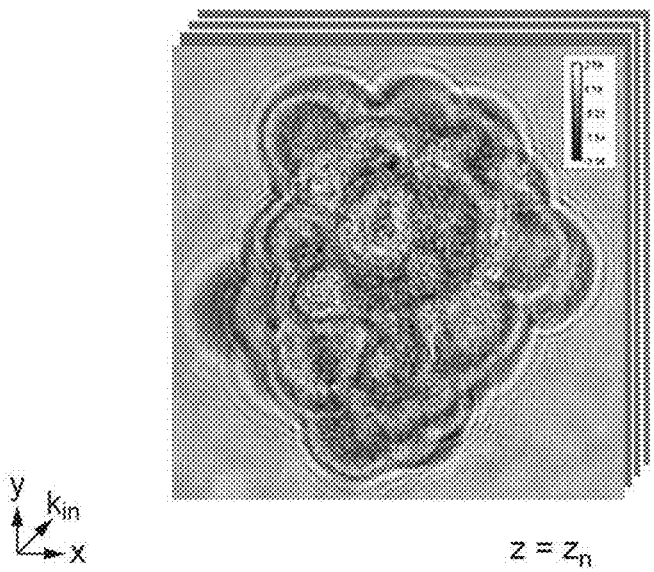
FIG. 30 is a complex amplitude image (real part, $z=z_n$) generated based on the complex amplitude image (FIG. 29) in the second complex amplitude image generation step S63.
Figure 31:
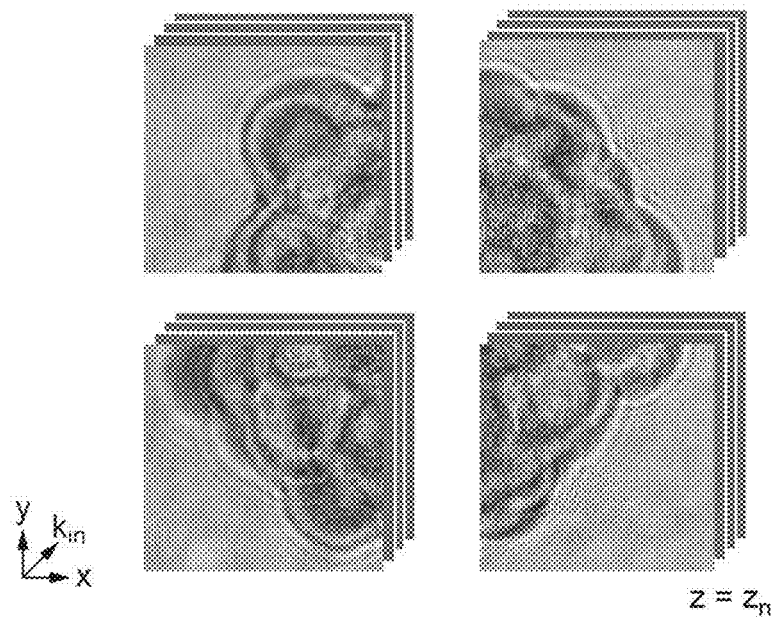
FIG. 31 includes a plurality of partial images (real part, $Z=z_n$) obtained by dividing the complex amplitude image (FIG. 30) in the phase conjugate operation step S64.
Figure 32:
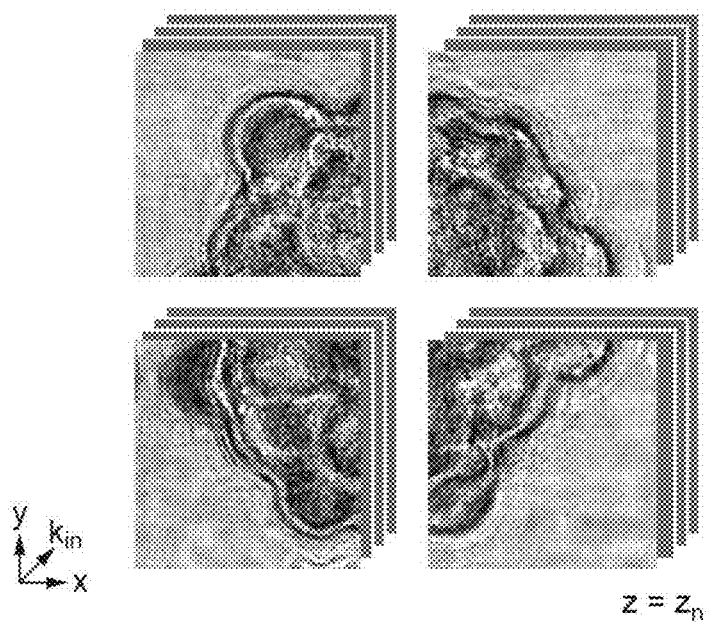
FIG. 32 includes partial images (real part, $z=z_n$) obtained by performing the phase conjugate operation on each of the plurality of partial images (FIG. 31) in the phase conjugate operation step S64.

FIG. 28 is an interference intensity image (with vertical irradiation) acquired in the interference intensity image acquisition step S61. FIG. 29 is a complex amplitude image (real part, z=0) generated based on the interference intensity image (FIG. 28) in the first complex amplitude image generation step S62. FIG. 30 is a complex amplitude image (real part, $z=z_n$) generated based on the complex amplitude image (FIG. 29) in the second complex amplitude image generation step S63. FIG. 31 includes a plurality of partial images (real part, $z=z_n$) obtained by dividing the complex amplitude image (FIG. 30) in the phase conjugate operation step S64. FIG. 32 includes partial images (real part, $Z=z_n$) obtained by performing the phase conjugate operation on each of the plurality of partial images (FIG. 31) in the phase conjugate operation step S64.

Figure 33:
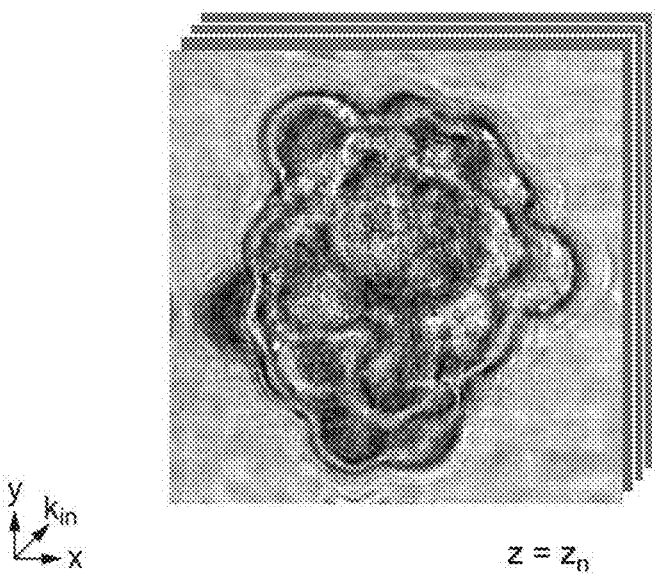
FIG. 33 is a complex amplitude image (real part, $z=z_n$) obtained by combining the plurality of partial images (FIG. 32) after the phase conjugate operation in the phase conjugate operation step S64.

FIG. 33 is a complex amplitude image (real part, $z=z_n$) obtained by combining the plurality of partial images (FIG. 32) after the phase conjugate operation in the phase conjugate operation step S64. FIG. 34 includes complex differential interference images (imaginary parts respectively for x direction shear and y direction shear) generated based on the complex amplitude image (FIG. 33) in the step S21 in the two-dimensional phase image generation step S65. FIG. 35 includes phase differential images (x direction shear and y direction shear) generated based on the complex differential interference images (FIG. 34) in the step S22 in the two-dimensional phase image generation step S65.

Figure 38:
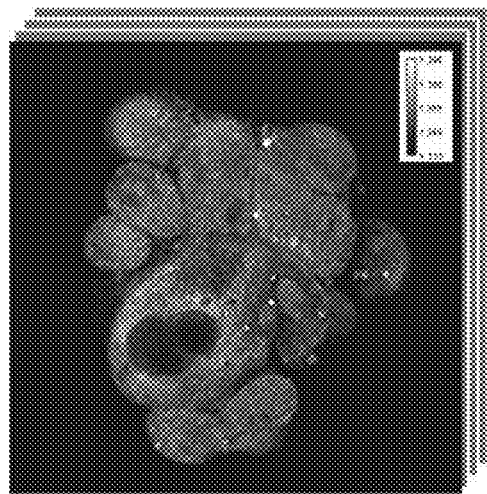
FIG. 38 is a refractive index distribution generated based on the phase differential images in the refractive index distribution calculation step S67.

FIG. 36 includes phase differential images (x direction shear and y direction shear) generated based on the complex amplitude image (FIG. 30) in which the phase conjugate operation step S64 is not performed in the step S22 in the two-dimensional phase image generation step S65. FIG. 37 includes phase differential images (x direction shear and y direction shear) obtained by combining the phase differential images (FIG. 35) obtained in the case in which the phase conjugate operation step S64 is performed and the phase differential images (FIG. 36) obtained in the case in which the phase conjugate operation step S64 is not performed. FIG. 38 is a refractive index distribution generated based on the phase differential images in the refractive index distribution calculation step S67.

FIG. 39 includes phase differential images at a position of z=10.4 μm. FIG. 40 includes phase differential images at a position of z=32.4 μm. FIG. 41 includes phase differential images at a position of z=54.0 μm. (a) in each diagram is the phase differential image obtained in the case in which the phase conjugate operation is not performed. (b) in each diagram is the phase differential image obtained in the case in which the phase conjugate operation is performed.

At the position close to the imaging unit, in a region indicated by an arrow in FIG. 39, presence of granules is clearly shown in the phase differential image ((a) in FIG. 39) obtained in the case in which the phase conjugate operation step S64 is not performed, whereas presence of granules is not shown in the phase differential image ((b) in FIG. 39) obtained in the case in which the phase conjugate operation is performed. On the other hand, at the position far from the imaging unit, in a region indicated by an arrow in FIG. 41, presence of granules is not shown in the phase differential image ((a) in FIG. 41) obtained in the case in which the phase conjugate operation step S64 is not performed, whereas presence of granules is clearly shown in the phase differential image ((b) in FIG. 41) obtained in the case in which the phase conjugate operation is performed.

FIG. 42 includes refractive index distributions at the position of z=10.4 μm. FIG. 43 includes refractive index distributions at the position of z=54.0 μm. (a) in each diagram is the refractive index distribution obtained in the case in which the phase conjugate operation is not performed. (b) in each diagram is the refractive index distribution obtained by combining and reconstructing the phase differential images respectively in the case in which the phase conjugate operation is performed and in the case in which the phase conjugate operation is not performed.

At the position close to the imaging unit, as shown in FIG. 42, a difference is small between the refractive index distribution obtained in the case in which the phase conjugate operation is not performed ((a) in FIG. 42) and the refractive index distribution obtained by combining and reconstructing the phase differential images respectively in the case in which the phase conjugate operation is performed and in the case in which the phase conjugate operation is not performed ((b) in FIG. 42). On the other hand, at the position far from the imaging unit, in a region indicated by an arrow in FIG. 43, presence of granules is not shown in the refractive index distribution ((a) in FIG. 43) obtained in the case in which the phase conjugate operation is not performed, whereas presence of granules is clearly shown in the refractive index distribution ((b) in FIG. 43) obtained by combining and reconstructing the phase differential images respectively in the case in which the phase conjugate operation is performed and in the case in which the phase conjugate operation is not performed.

As described above, for the position relatively close to the imaging unit, the phase image generated based on the complex amplitude image before performing the phase conjugate operation is mainly used, and for the position relatively far from the imaging unit, the phase image generated based on the complex amplitude image after performing the phase conjugate operation is mainly used, thereby improving the degree of depth in the observation of the observation object.

Figure 44:
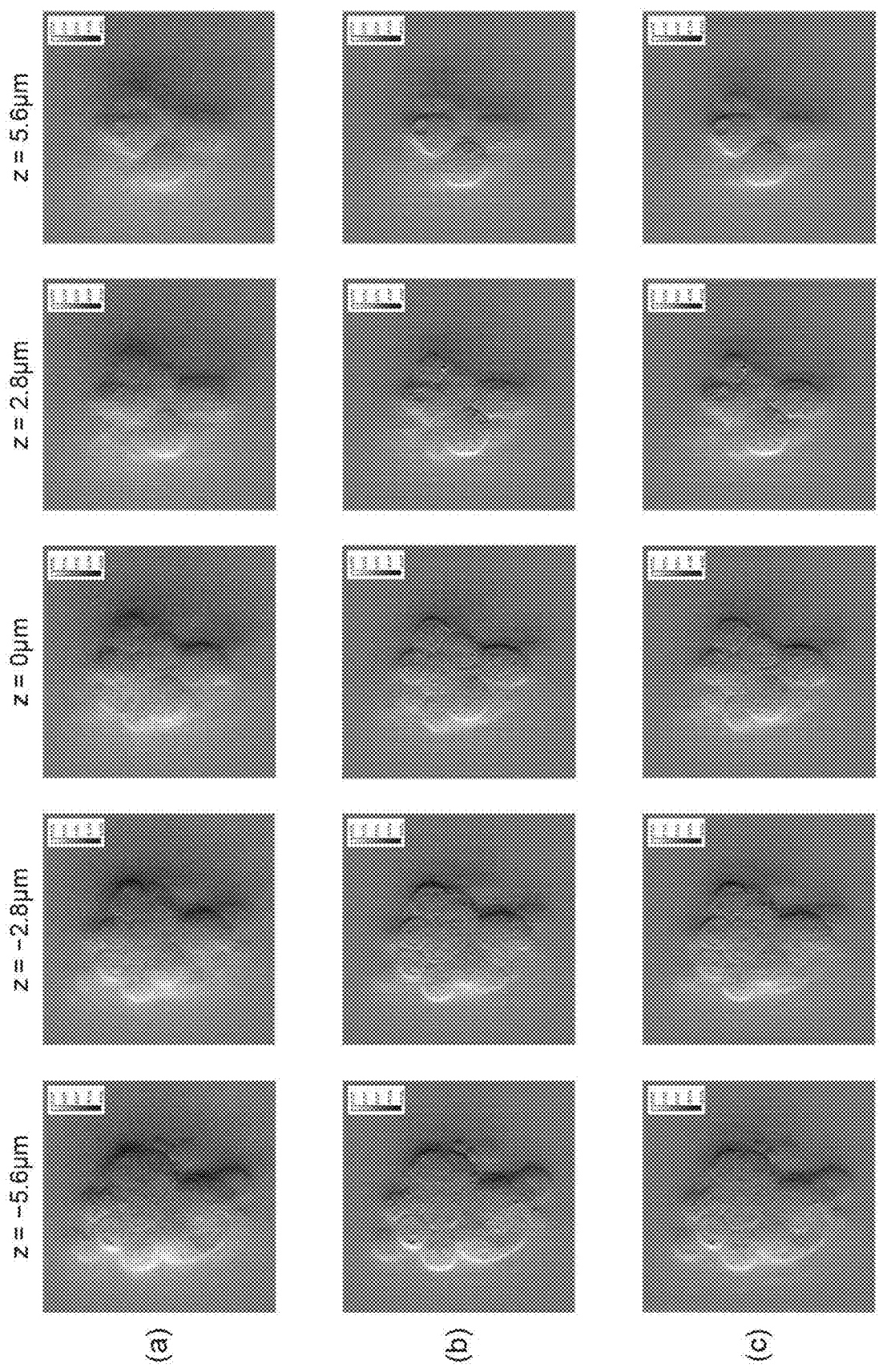
FIG. 44 includes (a) phase differential images at respective z positions obtained in a case in which the phase conjugate operation is not performed, (b) phase differential images at the respective z positions obtained in a case in which the processing step of the phase conjugate operation step S64 is performed after the processing step of the second complex amplitude image generation step S63 according to the procedure illustrated in FIG. 12, and (c) phase differential images at the respective z positions obtained in a case in which the processing step of the phase conjugate operation step S64 is performed before the processing step of the second complex amplitude image generation step S63 according to the procedure illustrated in FIG. 13.

(a) in FIG. 44 includes phase differential images at respective z positions obtained in the case in which the phase conjugate operation is not performed. (b) in FIG. 44 includes phase differential images at the respective z positions obtained in the case in which the processing step of the phase conjugate operation step S64 is performed after the processing step of the second complex amplitude image generation step S63 according to the procedure illustrated in FIG. 12. (c) in FIG. 44 includes phase differential images at the respective z positions obtained in the case in which the processing step of the phase conjugate operation step S64 is performed before the processing step of the second complex amplitude image generation step S63 according to the procedure illustrated in FIG. 13. In each of (a) to (c) in FIG. 44, the phase differential images at the respective positions of z=−5.6 µm, −2.8 µm, 0 µm, 2.8 µm, and 5.6 µm are shown.

In the case in which the processing step of the phase conjugate operation step S64 is performed before the processing step of the second complex amplitude image generation step S63 ((c) in FIG. 44), as compared with the case in which the processing step of the phase conjugate operation step S64 is performed after the processing step of the second complex amplitude image generation step S63 ((b) in FIG. 44), the equivalent image quality is obtained in the phase differential images at the respective positions of z=−2.8 µm, 0 µm, and 2.8 µm, while the internal structure slightly disappears in the phase differential images at the respective positions of z=−5.6 µm and 5.6 µm.

However, in the two cases respectively in which the phase conjugate operation is performed ((b) and (c) in FIG. 44), as compared with the case in which the phase conjugate operation is not performed ((a) in FIG. 44), the internal structure can be seen even at the position far from the imaging unit, and the degree of depth in the observation of the observation object can be improved.

In addition, in the case in which the processing step of the phase conjugate operation step S64 is performed before the processing step of the second complex amplitude image generation step S63 ((c) in FIG. 44), as compared with the case in which the processing step of the phase conjugate operation step S64 is performed after the processing step of the second complex amplitude image generation step S63 ((b) in FIG. 44), the number of times of processing of the phase conjugate method, which is bottleneck for the calculation time, can be reduced, and thus, the processing time can be shortened.

The observation apparatus and the observation method are not limited to the embodiments and configuration examples described above, and various modifications are possible.

The observation apparatus of the above embodiment includes (1) an interference intensity image acquisition unit for acquiring, for each of a plurality of light irradiation directions, an interference intensity image at a reference position from an imaging unit for imaging the interference intensity image at the reference position generated by interference between light irradiating an observation object along each of the plurality of light irradiation directions and passed through the observation object and reference light; (2) a first complex amplitude image generation unit for generating, for each of the plurality of light irradiation directions, a complex amplitude image at the reference position based on the interference intensity image at the reference position; (3) a second complex amplitude image generation unit for generating, for each of the plurality of light irradiation directions, a complex amplitude image at each of a plurality of positions based on the complex amplitude image at the reference position; (4) a phase conjugate operation unit for performing, before, during, or after a processing step by the second complex amplitude image generation unit, a phase conjugate operation on the complex amplitude image of each of the plurality of light irradiation directions to generate a complex amplitude image of each of the plurality of light irradiation directions when a relationship between light irradiation and imaging for the observation object is reversed; (5) a two-dimensional phase image generation unit for generating, for each of the plurality of positions, a complex differential interference image of each of the plurality of light irradiation directions based on the complex amplitude image of each of the plurality of light irradiation directions generated by the second complex amplitude image generation unit or the phase conjugate operation unit, and generating a two-dimensional phase image based on the complex differential interference image of each of the plurality of light irradiation directions; and (6) a three-dimensional phase image generation unit for generating a three-dimensional phase image based on the two-dimensional phase image at each of the plurality of positions, and when a phase image generated based on the complex amplitude image before performing the operation by the phase conjugate operation unit is set as a first phase image, and a phase image generated based on the complex amplitude image obtained by performing the operation by the phase conjugate operation unit is set as a second phase image, out of the plurality of positions, the two-dimensional phase image generation unit generates the two-dimensional phase image mainly based on the first phase image at a position relatively close to the imaging unit, and generates the two-dimensional phase image mainly based on the second phase image at a position relatively far from the imaging unit.

In the above observation apparatus, the two-dimensional phase image generation unit may generate the two-dimensional phase image based on a summation of the complex differential interference images of the plurality of light irradiation directions.

In the above observation apparatus, the phase conjugate operation unit may divide the complex amplitude image into a plurality of partial images each having the same number of pixels as a matrix dimension in a light irradiation side wavenumber space for the observation object, perform the phase conjugate operation on each of the plurality of partial images, and then combine the plurality of partial images.

In the above observation apparatus, the two-dimensional phase image generation unit may use a weight function $\alpha$ having a differential coefficient of 0 or less with respect to a variable z representing a distance from the imaging unit along a light propagation path, and set a sum of $\alpha$ times the first phase image and $(1-\alpha)$ times the second phase image as the two-dimensional phase image.

In the above case, the two-dimensional phase image generation unit may use, as the weight function $\alpha$, a function having a positive value in a range in which a value of the variable z is a threshold value or less, and having a value of 0 in a range other than the range. Further, the two-dimensional phase image generation unit may use, as the weight function α, a function having a value according to a position on a plane perpendicular to an optical axis of the imaging unit.

In the above observation apparatus, the two-dimensional phase image generation unit may generate the complex differential interference image of each of the plurality of light irradiation directions for each of a plurality of shear directions on the image different from each other based on the complex amplitude image of each of the plurality of light irradiation directions, and generate the two-dimensional phase image based on the complex differential interference image of each of the plurality of shear directions and the plurality of light irradiation directions.

The above observation apparatus may further include a refractive index distribution calculation unit for obtaining a three-dimensional refractive index distribution of the observation object based on the three-dimensional phase image.

The observation method of the above embodiment includes (1) an interference intensity image acquisition step of acquiring, for each of a plurality of light irradiation directions, an interference intensity image at a reference position from an imaging unit for imaging the interference intensity image at the reference position generated by interference between light irradiating an observation object along each of the plurality of light irradiation directions and passed through the observation object and reference light; (2) a first complex amplitude image generation step of generating, for each of the plurality of light irradiation directions, a complex amplitude image at the reference position based on the interference intensity image at the reference position; (3) a second complex amplitude image generation step of generating, for each of the plurality of light irradiation directions, a complex amplitude image at each of a plurality of positions based on the complex amplitude image at the reference position; (4) a phase conjugate operation step of performing, before, during, or after a processing step by the second complex amplitude image generation step, a phase conjugate operation on the complex amplitude image of each of the plurality of light irradiation directions to generate a complex amplitude image of each of the plurality of light irradiation directions when a relationship between light irradiation and imaging for the observation object is reversed; (5) a two-dimensional phase image generation step of generating, for each of the plurality of positions, a complex differential interference image of each of the plurality of light irradiation directions based on the complex amplitude image of each of the plurality of light irradiation directions generated by the second complex amplitude image generation step or the phase conjugate operation step, and generating a two-dimensional phase image based on the complex differential interference image of each of the plurality of light irradiation directions; and (6) a three-dimensional phase image generation step of generating a three-dimensional phase image based on the two-dimensional phase image at each of the plurality of positions, and when a phase image generated based on the complex amplitude image before performing the operation by the phase conjugate operation step is set as a first phase image, and a phase image generated based on the complex amplitude image obtained by performing the operation by the phase conjugate operation step is set as a second phase image, out of the plurality of positions, the two-dimensional phase image generation step includes generating the two-dimensional phase image mainly based on the first phase image at a position relatively close to the imaging unit, and generating the two-dimensional phase image mainly based on the second phase image at a position relatively far from the imaging unit.

In the above observation method, the two-dimensional phase image generation step may include generating the two-dimensional phase image based on a summation of the complex differential interference images of the plurality of light irradiation directions.

In the above observation method, the phase conjugate operation step may include dividing the complex amplitude image into a plurality of partial images each having the same number of pixels as a matrix dimension in a light irradiation side wavenumber space for the observation object, performing the phase conjugate operation on each of the plurality of partial images, and then combining the plurality of partial images.

In the above observation method, the two-dimensional phase image generation step may include using a weight function α having a differential coefficient of 0 or less with respect to a variable z representing a distance from the imaging unit along a light propagation path, and setting a sum of α times the first phase image and (1−α) times the second phase image as the two-dimensional phase image.

In the above case, the two-dimensional phase image generation step may include using, as the weight function α, a function having a positive value in a range in which a value of the variable z is a threshold value or less, and having a value of 0 in a range other than the range. Further, the two-dimensional phase image generation step may include using, as the weight function α, a function having a value according to a position on a plane perpendicular to an optical axis of the imaging unit.

In the above observation method, the two-dimensional phase image generation step may include generating the complex differential interference image of each of the plurality of light irradiation directions for each of a plurality of shear directions on the image different from each other based on the complex amplitude image of each of the plurality of light irradiation directions, and generating the two-dimensional phase image based on the complex differential interference image of each of the plurality of shear directions and the plurality of light irradiation directions.

The above observation method may further include a refractive index distribution calculation step of obtaining a three-dimensional refractive index distribution of the observation object based on the three-dimensional phase image.

The program of the above embodiment is a program for causing a computer to execute the steps of the observation method of the above configuration.

The recording medium of the above embodiment is a computer readable recording medium recording the program of the above configuration.

INDUSTRIAL APPLICABILITY

The embodiments can be used as an observation apparatus and an observation method capable of observing an observation object while reducing influence of multiple scattered light even when the observation object is a multiple scattering object.

REFERENCE SIGNS LIST 1A-1C—observation apparatus, 2—recording medium, 11—light source, 12—lens, 13—light input end, 14—optical fiber, 15—fiber coupler, 16, 17—optical fiber, 18, 19—light output end, 21—lens, 22—mirror, 23—lens, 24—condenser lens, 25—objective lens, 31—lens, 32—mirror, 33—drive unit, 34—lens, 41—beam splitter, 42—lens, 43—imaging unit, 60—analysis unit, 61—interference intensity image acquisition unit, 62—first complex amplitude image generation unit, 63—second complex amplitude image generation unit, 64—phase conjugate operation unit, 65—two-dimensional phase image generation unit, 66—three-dimensional phase image generation unit, 67—refractive index distribution calculation unit, 68—display unit, 69—storage unit.

The invention claimed is:

1. An observation apparatus comprising:
an interference intensity image acquisition unit configured to acquire, for each of a plurality of light irradiation directions, an interference intensity image at a reference position from an imaging unit configured to image the interference intensity image at the reference position generated by interference between light irradiating an observation object along each of the plurality of light irradiation directions and passed through the observation object and reference light;
a first complex amplitude image generation unit configured to generate, for each of the plurality of light irradiation directions, a complex amplitude image at the reference position based on the interference intensity image at the reference position;
a second complex amplitude image generation unit configured to generate, for each of the plurality of light irradiation directions, a complex amplitude image at each of a plurality of positions based on the complex amplitude image at the reference position;
a phase conjugate operation unit configured to perform, before, during, or after a processing step by the second complex amplitude image generation unit, a phase conjugate operation on the complex amplitude image of each of the plurality of light irradiation directions to generate a complex amplitude image of each of the plurality of light irradiation directions when a relationship between light irradiation and imaging for the observation object is reversed;
a two-dimensional phase image generation unit configured to generate, for each of the plurality of positions, a complex differential interference image of each of the plurality of light irradiation directions based on the complex amplitude image of each of the plurality of light irradiation directions generated by the second complex amplitude image generation unit or the phase conjugate operation unit, and generate a two-dimensional phase image based on the complex differential interference image of each of the plurality of light irradiation directions; and
a three-dimensional phase image generation unit configured to generate a three-dimensional phase image based on the two-dimensional phase image at each of the plurality of positions, wherein
when a phase image generated based on the complex amplitude image before performing the operation by the phase conjugate operation unit is set as a first phase image, and a phase image generated based on the complex amplitude image obtained by performing the operation by the phase conjugate operation unit is set as a second phase image, out of the plurality of positions, the two-dimensional phase image generation unit is configured to generate the two-dimensional phase image mainly based on the first phase image at a position relatively close to the imaging unit, and generate the two-dimensional phase image mainly based on the second phase image at a position relatively far from the imaging unit.

2. The observation apparatus according to claim 1, wherein the two-dimensional phase image generation unit is configured to generate the two-dimensional phase image based on a summation of the complex differential interference images of the plurality of light irradiation directions.

3. The observation apparatus according to claim 1, wherein the phase conjugate operation unit is configured to divide the complex amplitude image into a plurality of partial images each having the same number of pixels as a matrix dimension in a light irradiation side wavenumber space for the observation object, perform the phase conjugate operation on each of the plurality of partial images, and then combine the plurality of partial images.

4. The observation apparatus according to claim 1, wherein the two-dimensional phase image generation unit is configured to use a weight function $\alpha$ having a differential coefficient of 0 or less with respect to a variable z representing a distance from the imaging unit along a light propagation path, and set a sum of $\alpha$ times the first phase image and $(1-\alpha)$ times the second phase image as the two-dimensional phase image.

5. The observation apparatus according to claim 4, wherein the two-dimensional phase image generation unit is configured to use, as the weight function $\alpha$, a function having a positive value in a range in which a value of the variable z is a threshold value or less, and having a value of 0 in a range other than the range.

6. The observation apparatus according to claim 4, wherein the two-dimensional phase image generation unit is configured to use, as the weight function $\alpha$, a function having a value according to a position on a plane perpendicular to an optical axis of the imaging unit.

7. The observation apparatus according to claim 1, wherein the two-dimensional phase image generation unit is configured to
generate the complex differential interference image of each of the plurality of light irradiation directions for each of a plurality of shear directions on the image different from each other based on the complex amplitude image of each of the plurality of light irradiation directions, and
generate the two-dimensional phase image based on the complex differential interference image of each of the plurality of shear directions and the plurality of light irradiation directions.

8. The observation apparatus according to claim 1, further comprising a refractive index distribution calculation unit configured to obtain a three-dimensional refractive index distribution of the observation object based on the three-dimensional phase image.

9. An observation method comprising:
performing an interference intensity image acquisition of acquiring, for each of a plurality of light irradiation directions, an interference intensity image at a reference position from an imaging unit configured to image the interference intensity image at the reference position generated by interference between light irradiating an observation object along each of the plurality of light irradiation directions and passed through the observation object and reference light;
performing a first complex amplitude image generation of generating, for each of the plurality of light irradiation directions, a complex amplitude image at the reference position based on the interference intensity image at the reference position;

performing a second complex amplitude image generation of generating, for each of the plurality of light irradiation directions, a complex amplitude image at each of a plurality of positions based on the complex amplitude image at the reference position;

performing a phase conjugate operation of performing, before, during, or after a processing step by the second complex amplitude image generation, a phase conjugate operation on the complex amplitude image of each of the plurality of light irradiation directions to generate a complex amplitude image of each of the plurality of light irradiation directions when a relationship between light irradiation and imaging for the observation object is reversed;

performing a two-dimensional phase image generation of generating, for each of the plurality of positions, a complex differential interference image of each of the plurality of light irradiation directions based on the complex amplitude image of each of the plurality of light irradiation directions generated by the second complex amplitude image generation or the phase conjugate operation, and generating a two-dimensional phase image based on the complex differential interference image of each of the plurality of light irradiation directions; and performing a three-dimensional phase image generation of generating a three-dimensional phase image based on the two-dimensional phase image at each of the plurality of positions, wherein when a phase image generated based on the complex amplitude image before performing the operation by the phase conjugate operation is set as a first phase image, and a phase image generated based on the complex amplitude image obtained by performing the operation by the phase conjugate operation is set as a second phase image, out of the plurality of positions, the two-dimensional phase image generation includes generating the two-dimensional phase image mainly based on the first phase image at a position relatively close to the imaging unit, and generating the two-dimensional phase image mainly based on the second phase image at a position relatively far from the imaging unit.

10. The observation method according to claim 9, wherein the two-dimensional phase image generation includes generating the two-dimensional phase image based on a summation of the complex differential interference images of the plurality of light irradiation directions.

11. The observation method according to claim 9, wherein the phase conjugate operation includes dividing the complex amplitude image into a plurality of partial images each having the same number of pixels as a matrix dimension in a light irradiation side wavenumber space for the observation object, performing the phase conjugate operation on each of the plurality of partial images, and then combining the plurality of partial images.

12. The observation method according to claim 9, wherein the two-dimensional phase image generation includes using a weight function $\alpha$ having a differential coefficient of 0 or less with respect to a variable z representing a distance from the imaging unit along a light propagation path, and setting a sum of $\alpha$ times the first phase image and $(1-\alpha)$ times the second phase image as the two-dimensional phase image.

13. The observation method according to claim 12, wherein the two-dimensional phase image generation includes using, as the weight function $\alpha$, a function having a positive value in a range in which a value of the variable z is a threshold value or less, and having a value of 0 in a range other than the range.

14. The observation method according to claim 12, wherein the two-dimensional phase image generation includes using, as the weight function $\alpha$, a function having a value according to a position on a plane perpendicular to an optical axis of the imaging unit.

15. The observation method according to claim 9, wherein the two-dimensional phase image generation includes
generating the complex differential interference image of each of the plurality of light irradiation directions for each of a plurality of shear directions on the image different from each other based on the complex amplitude image of each of the plurality of light irradiation directions, and
generating the two-dimensional phase image based on the complex differential interference image of each of the plurality of shear directions and the plurality of light irradiation directions.

16. The observation method according to claim 9, further comprising performing a refractive index distribution calculation of obtaining a three-dimensional refractive index distribution of the observation object based on the three-dimensional phase image.

17. A non-transitory computer-readable medium storing a program, the program, when executed by a computer, performing the observation method according to claim 9.

* * * * *